US011336170B2

(12) United States Patent
Maruyama

(10) Patent No.: US 11,336,170 B2
(45) Date of Patent: May 17, 2022

(54) FREQUENCY SETTING IN A POWER SUPPLY DEVICE, POWER SUPPLY CONTROL DEVICE, AND POWER SUPPLY CONTROL METHOD

(71) Applicant: FUJI ELECTRIC CO., LTD., Kanagawa (JP)

(72) Inventor: Hiroshi Maruyama, Matsumoto (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 95 days.

(21) Appl. No.: 16/799,761

(22) Filed: Feb. 24, 2020

(65) Prior Publication Data

US 2020/0195128 A1 Jun. 18, 2020

Related U.S. Application Data

(63) Continuation of application No. PCT/JP2019/002591, filed on Jan. 25, 2019.

(30) Foreign Application Priority Data

Mar. 13, 2018 (JP) .............................. JP2018-046071

(51) Int. Cl.
*H02M 1/36* (2007.01)
*H02M 7/217* (2006.01)
(Continued)

(52) U.S. Cl.
CPC .............. *H02M 1/36* (2013.01); *H02M 1/32* (2013.01); *H02M 3/335* (2013.01); *H02M 7/217* (2013.01)

(58) Field of Classification Search
CPC ............................... H02M 1/36; H02M 7/217
See application file for complete search history.

(56) References Cited

U.S. PATENT DOCUMENTS 5,030,887 A * 7/1991 Guisinger .......... H05B 41/2983
315/158
6,388,902 B1 5/2002 Yasumura
(Continued)

FOREIGN PATENT DOCUMENTS

JP       H0496651 A      3/1992
JP     2000324826 A    11/2000
(Continued)

OTHER PUBLICATIONS

International Search Report and (ISA/237) Written Opinion of the International Search Authority for International Patent Application No. PCT/JP2019/002591, mailed by the Japan Patent Office dated Apr. 9, 2019.

*Primary Examiner* — Gustavo A Rosario-Benitez

(57) ABSTRACT

Provided is a power supply device comprising a voltage conversion portion configured to convert input voltage to output voltage by pulse width modulation, a frequency reduction circuit configured to reduce a frequency of the pulse width modulation in response to detection of an overload during normal operation of the voltage conversion portion and startup of the voltage conversion portion, and a frequency setting circuit configured to set the frequency of the pulse width modulation used when starting up the voltage conversion portion to a frequency higher than a minimum frequency corresponding to the overload. In addition, provided is a power supply control device and a power supply control method relating to the power supply device.

19 Claims, 10 Drawing Sheets

(51) Int. Cl.
*H02M 3/335* (2006.01)
*H02M 1/32* (2007.01)

(56) References Cited

U.S. PATENT DOCUMENTS

| | | | | |
|---|---|---|---|---|
| 7,116,564 | B2* | 10/2006 | Takahashi | H02M 3/33523 363/21.16 |
| 7,362,191 | B2* | 4/2008 | Chen | H02M 1/44 331/78 |
| 8,669,751 | B2* | 3/2014 | Balakrishnan | H02M 3/33507 323/299 |
| 2004/0012986 | A1* | 1/2004 | Riggio | H02M 1/4258 363/26 |
| 2006/0093017 | A1* | 5/2006 | Gong | H02M 3/33507 375/134 |
| 2007/0291523 | A1* | 12/2007 | Fukumoto | H02M 7/53806 363/134 |
| 2009/0001944 | A1* | 1/2009 | Kim | H02M 1/36 323/238 |
| 2009/0201705 | A1* | 8/2009 | Murata | H02M 3/33523 363/53 |
| 2009/0302816 | A1* | 12/2009 | Kunimatsu | H02M 1/36 323/282 |
| 2010/0237792 | A1* | 9/2010 | Kimura | H05B 41/2887 315/219 |
| 2011/0075450 | A1* | 3/2011 | Shimada | H02M 1/36 363/21.18 |
| 2012/0049823 | A1* | 3/2012 | Chen | H02M 3/157 323/282 |
| 2012/0155127 | A1* | 6/2012 | Brokaw | H02M 1/36 363/49 |
| 2012/0250360 | A1* | 10/2012 | Orr | H02M 3/335 363/21.02 |
| 2012/0274299 | A1 | 11/2012 | Chang | |
| 2014/0185340 | A1 | 7/2014 | Maruyama | |
| 2015/0249380 | A1* | 9/2015 | Hayakawa | H02M 3/33523 363/21.16 |
| 2015/0280585 | A1* | 10/2015 | Hayakawa | H02M 3/33507 363/21.13 |
| 2017/0012542 | A1* | 1/2017 | Nishijima | H02M 3/33523 |
| 2017/0070149 | A1* | 3/2017 | Guan | H02M 1/32 |
| 2017/0099011 | A1* | 4/2017 | Freeman | H02M 1/44 |
| 2017/0126140 | A1* | 5/2017 | Yu | H02M 1/36 |
| 2017/0271977 | A1 | 9/2017 | Madiwale | |
| 2017/0353103 | A1* | 12/2017 | Eum | H03G 1/0088 |
| 2017/0366089 | A1* | 12/2017 | Matsuda | H02M 3/33507 |
| 2018/0123581 | A1* | 5/2018 | Chiu | H03K 17/063 |

FOREIGN PATENT DOCUMENTS

| | | |
|---|---|---|
| JP | 2002300777 A | 10/2002 |
| JP | 2014131380 A | 7/2014 |
| JP | 2017163773 A | 9/2017 |

* cited by examiner

FREQUENCY SETTING IN A POWER SUPPLY DEVICE, POWER SUPPLY CONTROL DEVICE, AND POWER SUPPLY CONTROL METHOD

The contents of the following Japanese and PCT patent applications are incorporated herein by reference.
No. 2018-046071 filed in JP on Mar. 13, 2018, and
PCT/JP2019/002591 filed on Jan. 25, 2019.

BACKGROUND

1. Technical Field

The present invention relates to a power supply device, a power supply control device, and a power supply control method.

2. Related Art

Conventionally, there is known a switching power supply device that converts an input voltage to an output voltage by pulse width modulation (PWM) (see PTL 1). The switching power supply device described in PTL 1 has a current drooping function that droops the output current by reducing the switching frequency during overload (see paragraphs 0008 to 0009 of PTL 1). This switching power supply device forcibly sets the overload mode when the switching power supply device is started up (see paragraph 0025). As a result, the switching power supply device detects an overload state during startup and shifts from the normal mode to the overload mode, and thereby prevents the rising of the output voltage from becoming unstable as the switching frequency rapidly falls (see paragraphs 0013-0014).
Patent Document 1: Japanese Patent Application Publication No. 2014-131380

Technical Problem

The switching power supply device of PTL 1 smooths the drive signal OUT for switching the switching device Q with a capacitor to obtain a VF voltage that is proportional to the on-duty. Then, the switching power supply device reduces the switching frequency when the VF voltage is a low voltage (see paragraph 0007). Here, in order to stabilize the switching frequency, for example in PTL 1, it is desirable to stabilize parameters that affect the switching frequency, such as increasing the capacitance of the capacitor that smooths the VF voltage. However, stabilizing such parameters slows the rise in switching frequency in the overload mode that is forcibly set when starting up the switching power supply device, resulting in longer startup time, or depending on the load of the switching power supply device, there is a possibility of startup failure due to insufficient power supply.

General Disclosure

In a first aspect of the present invention, provided is a power supply device. The power supply device may include a voltage conversion portion for converting an input voltage to an output voltage by pulse width modulation. The power supply device may include a frequency reduction circuit for reducing the frequency of pulse width modulation in response to an overload detected during normal operation of the voltage conversion portion. The power supply device may include a frequency setting circuit for setting a frequency of the pulse width modulation used when starting up the voltage conversion portion to a frequency higher than a minimum frequency corresponding to the overload.

The voltage conversion portion may include a transformer. The voltage conversion portion may include a switching device that is driven by the pulse width modulation and switches whether or not the input voltage is applied to a primary side of the transformer. The voltage conversion portion may include a rectifier circuit for obtaining the output voltage from a secondary side of the transformer.

The power supply device may include an output voltage detection circuit that detects the output voltage. The power supply device may include an overload detection circuit for detecting the overload of the voltage conversion portion in response to the detected output voltage being less than a lower limit output voltage.

The overload detection circuit may detect the overload of the voltage conversion portion in response to a current flowing through the switching device exceeding an upper limit current.

The power supply device may include a soft start control voltage output portion for outputting a soft start control voltage for starting up the voltage conversion portion by a soft start. The power supply device may include an oscillator for outputting an oscillation signal that oscillates at the frequency of the pulse width modulation. The power supply device may include a pulse width modulation portion for outputting a pulse signal having a pulse width corresponding to a result of comparing the soft start control voltage and a voltage of the oscillation signal.

The soft start control voltage output portion may output a soft start control voltage obtained by charging a soft start capacitor with a soft start current in response to startup of the voltage conversion portion.

The soft start control voltage output portion may cause a setting obtainment current larger than the soft start current to flow to a soft start terminal connected to the soft start capacitor prior to startup of the voltage conversion portion. The power supply device may further include a setting voltage determination circuit for determining a voltage of the soft start terminal obtained in response to the flowing of the setting obtainment current. The frequency setting circuit may set the minimum frequency of the pulse width modulation during startup of the voltage conversion portion according to the voltage of the soft start terminal determined by the setting voltage determination circuit.

The power supply device may further include a setting resistor connected to the soft start terminal in series with the soft start capacitor.

The power supply device may further include a discharge control circuit for temporarily discharging the soft start capacitor in response to the setting of the minimum frequency of the pulse width modulation during startup of the voltage conversion portion.

The oscillator may have a capacitor. The oscillator may have a charge/discharge circuit for raising the oscillation signal corresponding to the voltage of the capacitor to a predetermined upper limit voltage by supplying a charge current to the capacitor, and for lowering the oscillation signal to a predetermined lower limit voltage by discharging a discharge current from the capacitor. The frequency setting circuit may set the minimum frequency of the pulse width modulation by controlling a current amount of at least one of the charge current and the discharge current.

In the second aspect of the present invention, provided is a power supply control device for controlling a voltage conversion portion for converting an input voltage to an output voltage by pulse width modulation. The power supply control device may include a frequency reduction circuit for reducing a frequency of the pulse width modulation in response to detection of an overload during normal operation of the voltage conversion portion. The power supply control device may include a frequency setting circuit for setting the frequency of the pulse width modulation used when starting up the voltage conversion portion to a frequency higher than the minimum frequency corresponding to the overload.

The voltage conversion portion may include a transformer. The voltage conversion portion may include a switching device that is driven by the pulse width modulation and switches whether or not the input voltage is applied to a primary side of the transformer. The voltage conversion portion may include a rectifier circuit for obtaining the output voltage from a secondary side of the transformer. The voltage conversion portion may include an output voltage detection circuit that detects the output voltage. The power supply control device may further include an overload detection circuit for detecting an overload of the voltage conversion portion in response to the output voltage detected by the output voltage detection circuit being less than the lower limit output voltage.

The overload detection circuit may detect an overload of the voltage conversion portion in response to the current flowing through the switching device exceeding an upper limit current.

The power supply control device may include a soft start control voltage output portion for outputting a soft start control voltage for starting the voltage conversion portion by a soft start. The power supply control device may include an oscillator for outputting an oscillation signal that oscillates at the frequency of the pulse width modulation. The power supply control device may include a pulse width modulation portion for outputting a pulse signal having a pulse width corresponding to a result of comparing the soft start control voltage and a voltage of the oscillation signal.

The soft start control voltage output portion may output the soft start control voltage obtained by charging a soft start capacitor with a soft start current in response to startup of the voltage conversion portion.

The soft start control voltage output portion may cause a setting obtainment current larger than the soft start current to flow to a soft start terminal connected to the soft start capacitor prior to startup of the voltage conversion portion. The power supply control device may further include a setting voltage determination circuit for determining a voltage of the soft start terminal obtained in response to the flowing of the setting obtainment current. The frequency setting circuit may set the minimum frequency of the pulse width modulation during startup of the voltage conversion portion according to the voltage of the soft start terminal determined by the setting voltage determination circuit.

In the third aspect of the present invention, provided is a power supply control method for controlling a voltage conversion portion for converting an input voltage into an output voltage by pulse width modulation. The power supply control method may reduce a frequency of the pulse width modulation in response to detection of an overload of the voltage conversion portion. In the power supply control method, the frequency of the pulse width modulation used when starting up the voltage conversion portion may be set to a frequency higher than a minimum frequency corresponding to the overload.

The summary clause does not necessarily describe all necessary features of the embodiments of the present invention. The present invention may also be a sub-combination of the features described above.

DESCRIPTION OF EXEMPLARY EMBODIMENTS

Hereinafter, although the present invention will be described through embodiments of the invention, the following embodiments do not limit the invention according to the claims. In addition, not all the combinations of features described in the embodiments are essential for the solving means of the invention.

Figure 1:
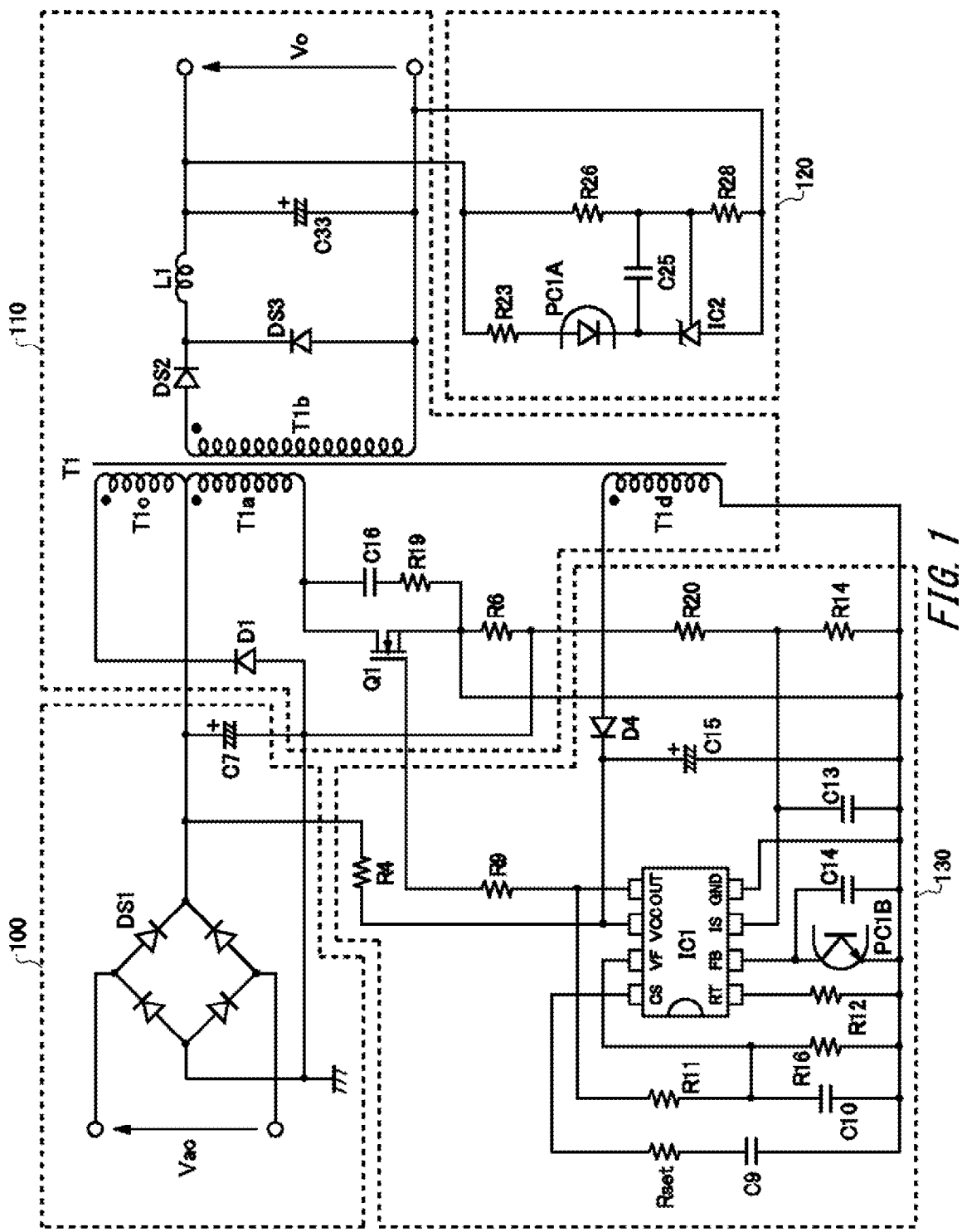
FIG. 1 shows a configuration of a power supply device 10 according to the present embodiment.

FIG. 1 shows a configuration of a power supply device 10 according to the present embodiment. The power supply device 10 converts an input voltage Vac to an output voltage Vo by PWM control. The power supply device 10 has a current drooping function that droops the output current by reducing a PWM frequency during an overload. The power supply device 10 according to the present embodiment has a function of setting the PWM frequency used when starting up the power supply device 10 to a frequency higher than the minimum frequency corresponding to an overload generated during normal operation.

In the present embodiment, the power supply device 10 is a configuration example in which the above functions and the like are added to the switching power supply device described in PTL 1 filed by the applicant of the present application. Instead of this, the power supply device 10 may be realized by adding the above functions and the like to another switching power supply device. Hereinafter, although the circuit configuration of the power supply device 10 and a power supply IC1 will be specifically described, each portion of the power supply device 10 and the power supply IC1 may be realized by other circuits that implement the function of each portion described below.

Figure 5:
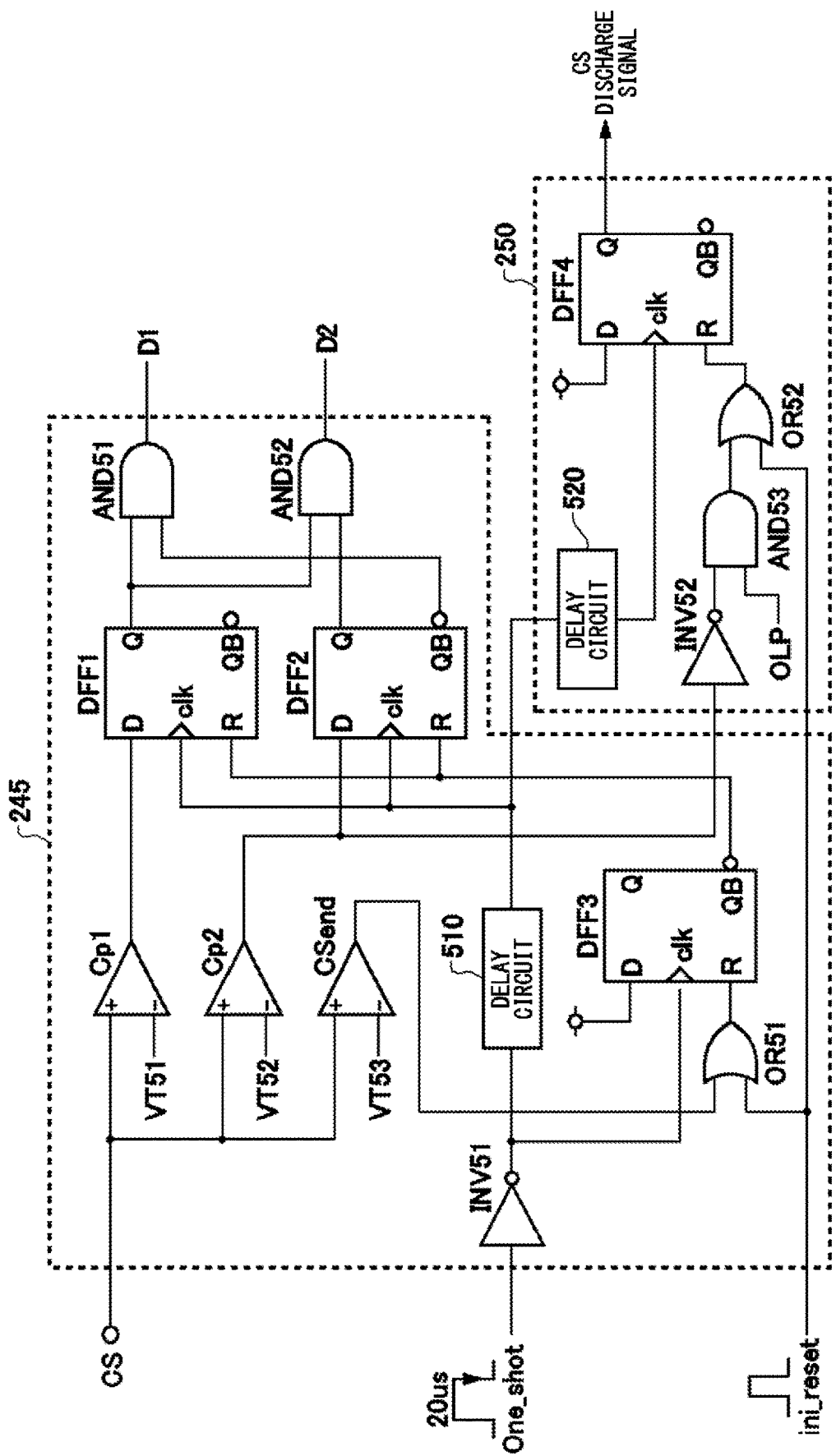
FIG. 5 shows a configuration of a setting voltage determination circuit 245 and a CS discharge control circuit 250 according to the present embodiment.

In the range described in the present figure, the power supply device 10 has the same configuration as that shown in FIG. 5 of PTL 1 except that a resistor Rset is electrically connected in series to a capacitor C9 electrically connected to a CS terminal of the power supply IC1. It is noted that in the description of the present application, hereinafter, the term "connection" means "electrical connection" unless otherwise specified, and may mean to be not only one in which parts are electrically connected directly, but also one in which parts are electrically connected indirectly with other parts connected in between.

The power supply device 10 includes an AC-DC conversion portion 100, a voltage conversion portion 110, an output voltage detection circuit 120, and a power supply control portion 130. The AC-DC conversion portion 100 converts the input AC voltage Vac into a DC voltage to supply it to the voltage conversion portion 110. The AC-DC conversion portion 100 includes a diode bridge DS1 and a capacitor C7. The diode bridge DS1 receives the AC voltage Vac from two AC input terminals, and full-wave rectifies the AC voltage Vac to output it from two DC output terminals (a DC voltage terminal and a ground terminal). The capacitor C7 is connected between the DC voltage terminal and the ground terminal of the diode bridge DS1, smooths the voltage output from the diode bridge DS1 to output the voltage to the voltage conversion portion 110. It is noted that when the DC voltage can be input from the outside, the power supply device 10 may not include the AC-DC conversion portion 100.

The voltage conversion portion 110 converts the input voltage to the output voltage by PWM. The voltage conversion portion 110 includes a transformer T1, a switching device Q1, a resistor R6, a snubber circuit (a capacitor C16 and a resistor R19), a diode D1, and a rectifier circuit that obtains the output voltage Vo from a secondary side of the transformer T1 (a diode DS2, a diode DS3, a reactor L1, and a capacitor C33).

The transformer T1 has primary windings T1a and T1c, a secondary winding T1b, and an auxiliary winding T1d. In the figure, black circles given to each of the windings indicate end portions having the same polarity in the windings, and in the present embodiment, the side with the black circle given to each winding is indicated as a first end, and the opposite side of the first end is indicated as a second end. In the primary winding T1a, and the primary winding T1c, the first end of the primary winding T1a and the second end of the primary winding T1c are made common, and this end is connected to the DC voltage terminal of the AC-DC conversion portion 100. The secondary winding T1b has a first end connected to a positive side voltage output terminal of the voltage conversion portion 110 via the diode DS2 and the reactor L1 in the voltage conversion portion 110, and a second end connected to a negative side voltage output terminal of the voltage conversion portion 110. The auxiliary winding T1d has a first end connected to a power supply terminal (VCC terminal) of the power supply IC1 via the diode D4 in the power supply control portion 130, and a second end connected to the ground of the power supply control portion 130, and the auxiliary winding T1d is used to supply a power supply voltage to the power supply IC1 in the power supply control portion 130.

The switching device Q1 and the resistor R6 are connected in series between the second end of the primary winding T1a, and the ground terminal of the AC-DC conversion portion 100. The switching device Q1 is an N channel MOS transistor. Alternatively, the switching device Q1 may be another MOS transistor, IGBT, or the like. The switching device Q1 has an electrical drain-source connection made via the resistor R6 between the second end of the primary winding T1a and the ground terminal of the AC-DC conversion portion 100, and its gate is driven by a drive signal from the power supply control portion 130. Thereby, the switching device Q1 is driven by PWM, and switches whether or not the input voltage from the capacitor C7 in the AC-DC conversion portion 100 is applied to the primary winding T1a located on the primary side of the transformer.

The resistor R6 functions as a current detection resistor for detecting the current flowing through the switching device Q1. That is, the resistor R6 generates, in the R6, a potential difference corresponding to the current flowing from the DC voltage terminal of the AC-DC conversion portion 100 through the primary winding T1a, the switching device Q1, and the resistor R6 to the ground terminal of the AC-DC conversion portion 100. In the present embodiment, the potential between the switching device Q1 and the resistor R6 is used as the ground potential of the power supply control portion 130, that is, the ground potential of the power supply IC1. As a result, the resistor R6 provides the power supply control unit 130 with a negative voltage with respect to the ground potential of the power supply IC1.

The snubber circuit includes the capacitor C16 and the resistor R19, and suppresses spike-like high voltage generated by the inductance of the primary winding T1a, along with the switching of the switching device Q1.

The diode D1 has an anode connected to the ground terminal of the AC-DC conversion portion 100 and a cathode connected to the first end of the primary winding T1c. The diode D1 constitutes, along with the primary winding T1c of the transformer T1, a magnetic flux reset circuit for resetting the magnetic energy remaining in the transformer T1 after the switching device Q1 is turned off.

The rectifier circuit of the secondary side of the transformer T1 obtains the output voltage from the secondary side of the transformer to output it as the output voltage Vo of the voltage conversion portion 110. The rectifier circuit includes a diode DS2 in which the anode and the cathode are electrically connected between the first end of the transformer T1b and the positive side voltage output terminal of the voltage conversion portion 110, the diode DS3 connected between the second end of the transformer T1b and the cathode of the diode DS2, the reactor L1 connected between the cathode of diode DS2 and the positive side voltage output terminal of the voltage conversion portion 110, and the capacitor C33 connected between the positive and negative side voltage output terminals of the voltage conversion portion 110, that is, between the positive side voltage output terminal and the second end of the transformer T1b.

The diode DS2 and the diode DS3 rectify the alternating voltage generated in the secondary winding T1b along with the switching of the switching device Q1. The reactor L1 and the capacitor C33 smooth the rectified voltage to output it as the output voltage Vo of the voltage conversion portion 110.

The output voltage detection circuit 120 is connected to the positive side voltage output terminal and the negative side voltage output terminal of the voltage conversion portion 110, detects the output voltage Vo output from the voltage conversion portion 110, to transmit a feedback signal corresponding to the output voltage Vo to the power supply control portion 130. The output voltage detection circuit 120 includes a resistance voltage dividing circuit (resistors R26 and R28) connected in series between the positive side voltage output terminal and the negative side voltage output terminal of the voltage conversion portion 110, a shunt regulator IC2, a photodiode PC1A and a resistor R23 connected in series between the negative side voltage output terminal and the positive side voltage output terminal of the voltage conversion portion 110, and a capacitor C25 connected between the photodiode PC1A and the shunt regulator IC2 and between the resistor R26 and the resistor R28.

The resistance voltage dividing circuit resistance-divides the output voltage Vo of the voltage conversion portion 110 by the resistor R26 and the resistor R28. The shunt regulator IC2 causes a current corresponding to the difference between the voltage divided by the resistance voltage dividing circuit and the voltage set in the shunt regulator IC2 to flow. The photodiode PC1A constitutes a photocoupler as a pair with a phototransistor PC1B in the power supply control portion 130. The photodiode PC1A irradiates the phototransistor PC1B with a light, as a feedback signal, having an intensity corresponding to the current flowing through the shunt regulator IC2, that is, a light having an intensity corresponding to the output voltage Vo. The resistor R23 sets the relationship between the voltage difference and the current in the shunt regulator IC2. The capacitor C25 is a phase compensation capacitor for the shunt regulator IC2.

The power supply control portion 130 controls the voltage conversion portion 110. The power supply control portion 130 includes: a resistor R4; a capacitor C15; a diode D4; a resistor R12; a resistor R20 and a resistor R14; a capacitor C13; the phototransistor PC1B; a capacitor C14; a resistor R9; a resistor R11, a capacitor C10 and a resistor R16; a capacitor C9; a resistor Rset; and the power supply IC1.

The resistor R4 is connected between the DC voltage terminal of the AC-DC conversion portion 100 and the power supply terminal VCC of the power supply IC1. The resistor R4 charges the capacitor C15 by causing a current from the DC voltage terminal of AC-DC conversion portion 100 to flow to the capacitor C15 connected to the power supply terminal VCC of the power supply IC1 in response to the power supply device 10 being powered on. As a result, the resistor R4 supplies the power supply power required by the power supply IC1 when the power supply device 10 is started up after being powered on.

The capacitor C15 is connected between both ends of the auxiliary winding T1d and between the power supply terminal (VCC terminal) and a ground terminal (GND terminal) of the power supply IC1, and accumulates the power supply voltage supplied to the power supply IC1. The diode D4 has an anode electrically connected to the first end side of the auxiliary winding T1d and a cathode electrically connected to the VCC terminal side of the power supply IC1, and supplies the voltage generated in the primary winding T1d to the capacitor C15 by the current flowing through the primary winding T1a after the operation of the power supply IC1 is started.

The resistor R12 is connected between an RT terminal of the power supply IC1 and the ground of the power supply control portion 130, and is used to set the PWM frequency of the power supply IC1. The resistor R20 and the resistor R14 are connected in series between the terminal of the resistor R6 opposite to the switching device Q1 and the ground of the power supply control portion 130, and resistance-divides the voltage of this terminal of the resistor R6, that is, the voltage corresponding to the current flowing through the switching device Q1. The capacitor C13 smooths the voltage divided by the resistor R20 and the resistor R14 to supply it to an IS terminal of power supply IC1 as a detection voltage (also referred to as "IS voltage") of the current flowing through the switching device Q1.

The phototransistor PC1B is connected between an FB terminal of the power supply IC1 and the ground of the power supply control portion 130. The phototransistor PC1B receives the light having an intensity corresponding to the output voltage Vo of the voltage conversion portion 110 from the photodiode PC1A, to supply a feedback signal of a voltage corresponding to the intensity of the light to the FB terminal. This feedback signal has a lower voltage as the output voltage Vo of the voltage conversion portion 110 is higher, and has a higher voltage as the output voltage Vo is lower. The capacitor C14 is connected between the FB terminal of the power supply IC1 and the ground of the power supply IC1, and smooths the feedback signal. In addition, the capacitor C14 maintains the voltage of the FB terminal (also referred to as "FB voltage") pulled up by the power supply IC1 in response to startup of the power supply IC1 until the output voltage Vo of the voltage conversion portion 110 rises to some extent and a current starts to flow through the phototransistor PC1B.

The resistor R9 is a gate resistor connected between an OUT terminal of the power supply IC1 and a gate of the switching device Q1. The resistor R11, the capacitor C10, and the resistor R16 smooth the drive signal output from the OUT terminal by the power supply IC1, to supply a VF voltage that rises as the on-duty becomes larger to a VF terminal of the power supply IC1. The resistor R11 and the resistor R16 are connected between the OUT terminal and the ground of the power supply IC1, and resistance voltage-divide the drive signal. The capacitor C10 is connected between somewhere between the resistor R11 and the resistor R16, and the ground, and smooths the resistance voltage-divided drive signal by accumulating it, to supply it to the VF terminal.

The capacitor C9 is electrically connected between the CS terminal and the ground of the power supply IC1, and is gradually charged from the discharged state after the AC-DC conversion portion 100 is started up, so that the voltage (indicated as "CS voltage") of the CS terminal (also indicated as "soft start terminal") of the power supply IC1 is gradually increased. Since the capacitor C9 is used for soft-starting the voltage conversion portion 110, it is also indicated as a "soft start capacitor". The CS voltage is a control voltage for starting up the voltage conversion portion 110 by soft start, and is also indicated as "soft start control voltage". The power supply IC1 uses the CS voltage to gradually raise the power supplied to the output side of the voltage conversion portion 110 by soft start.

The resistor Rset is a setting resistor that is connected in series with the capacitor C9 between the CS terminal and the ground of the power supply IC1, and that is used to set the PWM frequency used when starting up the voltage conversion portion 110. It is noted that although the power supply control portion 130 can adopt a method in which the PWM frequency is set according to the capacitance of the capacitor C9 without providing the resistor Rset, in this case, the rising speed of the CS voltage may change according to the setting of the PWM frequency.

The power supply IC1 receives a power supply voltage supplied to the VCC terminal and the GND terminal, to output, from the OUT terminal, a drive signal (also indicated as "drive signal OUT") for driving the switching device Q1. The main functions of the power supply IC1 are as follows.

(1) PWM Control Function

The power supply IC1 brings the output voltage Vo close to a target voltage by controlling the on-duty of the drive signal OUT output from the OUT terminal based on the feedback signal supplied to the FB terminal. Specifically, the power supply IC1 raises the on-duty of the switching device Q1 by increasing the pulse width of the drive signal OUT when the output voltage Vo of the voltage conversion portion 110 falls. In addition, the power supply IC1 reduces the on-duty of the switching device Q1 by reducing the pulse width of the drive signal OUT when the output voltage Vo of the voltage conversion portion 110 rises. As a result, the power supply device 10 can perform feedback control so that the output voltage Vo of the voltage conversion portion 110 approaches the target voltage.

(2) Overcurrent Limiting Function

The power supply IC1 detects an overcurrent flowing through the switching device Q1 using the IS voltage, and turns off the drive signal OUT in response to the flowing of the overcurrent. As a result, the power supply device 10 can prevent the switching device Q1 from deteriorating and failing by interrupting the switching device Q1 for each PWM pulse in a case where the overcurrent flows through the switching device Q1.

(3) Current Drooping Function

When the power supply IC1 detects that the overcurrent is flowing through the switching device Q1 based on the IS voltage, or when the voltage of the feedback signal (FB voltage) supplied to the FB terminal exceeds an overload voltage, the power supply IC1 detects that the voltage conversion portion 110 is overloaded. Here, the feedback signal exceeds the overload voltage when the output voltage Vo becomes less than a lower limit voltage due to factors such as high power consumption of the load connected to the voltage conversion portion 110. The power supply IC1 lowers the PWM frequency in response to the overload being detected, and droops the output current of the voltage conversion portion 110. Based on the VF voltage input to the VF terminal, the power supply IC1 reduces the PWM frequency as the on-duty of the drive signal OUT falls. As a result, in a state where the power supply device 10 limits the current on the primary side of the voltage conversion portion 110 due to the overload to limit the power supplied to the secondary side, the power supply device 10 can prevent the output current from increasing along with the fall of the output voltage Vo of the voltage conversion portion 110, in order to output the power.

(4) Soft Start Function

When starting its operation, the power supply IC1 pulls up the FB terminal so that the FB voltage exceeds the overload voltage. In this state, the output voltage Vo of the voltage conversion portion 110 has not risen, and the phototransistor PC1B is turned off, so that the FB voltage is maintained high by the capacitor C14. As a result, the AC-DC conversion portion 100 enters the overload mode. Thereby, the power supply IC1 can begin to startup the voltage conversion portion 110 from a state where the PWM frequency is reduced as compared with the normal mode (a state during normal operation after startup).

The power supply IC1 gradually raises the on-duty of the drive signal OUT using the CS voltage input to the CS terminal when the voltage conversion portion 110 is started up. When the voltage conversion portion 110 is started up, the power supply IC1 is not outputting the drive signal OUT, so the VF voltage is low. For this reason, the power supply IC1 reduces the PWM frequency and gradually raises the PWM frequency as the CS voltage rises (soft start). Here, when the voltage conversion portion 110 is started up, the power supply IC1 sets the PWM frequency to a higher frequency than when the overload mode is entered during operation in the normal mode. As a result, the AC-DC conversion portion 100 can shorten the startup time while soft-starting, and can stably raise the output voltage Vo.

Figure 2:
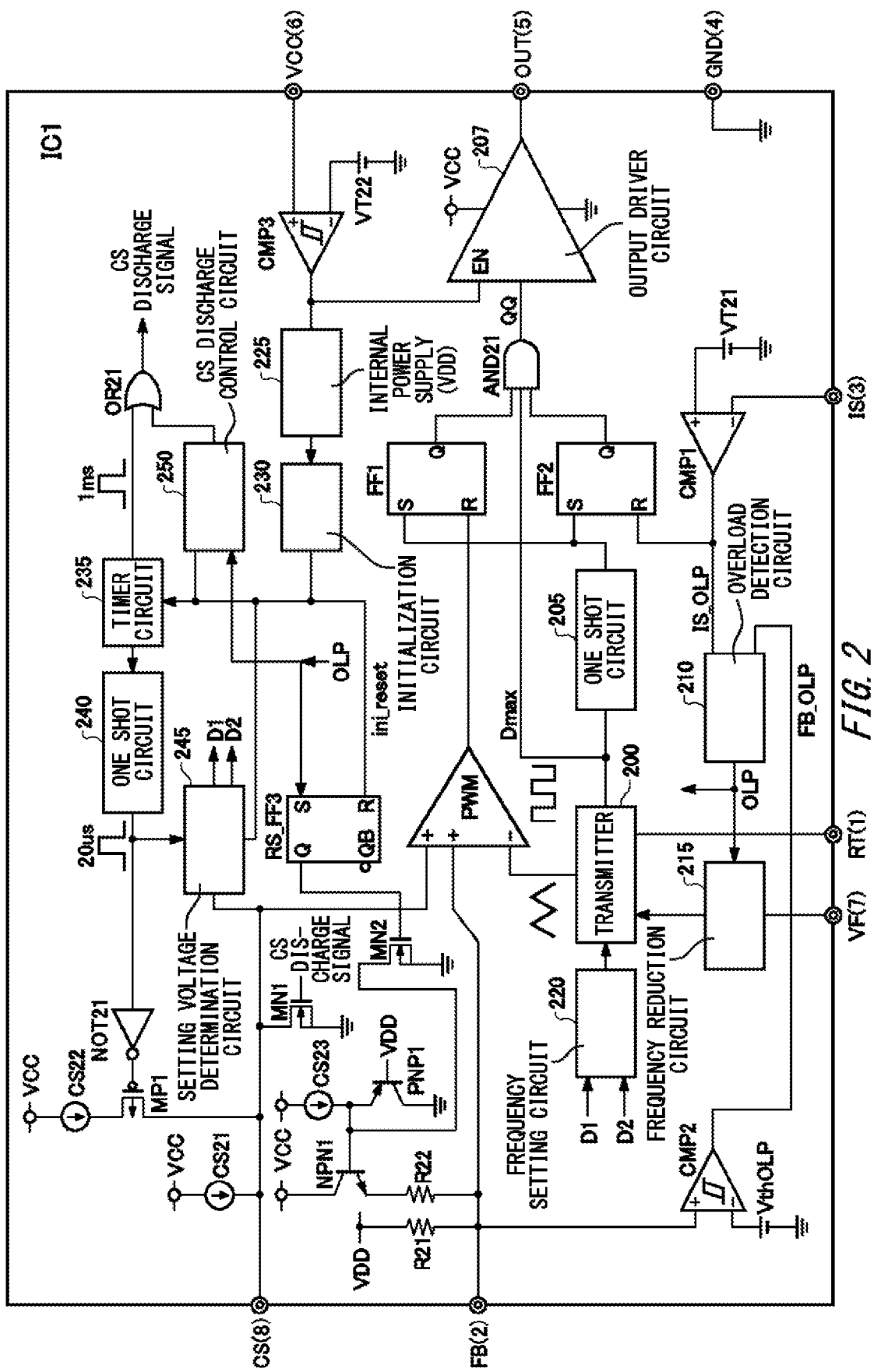
FIG. 2 shows a configuration of a power supply IC1 according to the present embodiment.

FIG. 2 shows a configuration of the power supply IC1 according to the present embodiment. The power supply IC1 functions as a power supply control device that controls the voltage conversion portion 110. The power supply IC1 includes the RT terminal (terminal 1), the FB terminal (terminal 2), the IS terminal (terminal 3), the GND terminal (terminal 4), the OUT terminal (terminal 5), the VCC terminal (terminal 6), the VF terminal (terminal), 7) and the CS terminal (terminal 8). The power supply IC1 includes an oscillator 200, a one-shot circuit 205, an overload detection circuit 210, a frequency reduction circuit 215, a frequency setting circuit 220, an internal power supply 225, an initialization circuit 230, a timer circuit 235, a one-shot circuit 240, a setting voltage determination circuit 245, a CS discharge control circuit 250, and other electrical and electronic circuits shown in the figure. It is noted that in the present embodiment, the power supply IC1 has a configuration in which the above-described components are packaged in one IC to form the power supply control device. Alternatively, the power supply control device may be obtained by dividing and mounting these components into a plurality of ICs, and may be obtained by performing, by a processor such as a microcontroller, functions of at least some of these components. Such a program may be recorded on a computer-readable medium and read-out and executed by a processor.

(1) Circuit Relating to PWM Control of Switching Device Q1

The oscillator 200 outputs an oscillation signal that oscillates at the PWM frequency to a PWM comparator (PWM in the figure). The oscillation signal output from the oscillator 200 is, for example, a triangular wave signal. The ratio of the rising period and the falling period of the oscillation signal is, for example, 1:1. The oscillator 200 oscillates at the PWM frequency corresponding to the resistor connected to the RT terminal of the power supply IC1. In addition, the oscillator 200 reduces the PWM frequency in response to an input from the frequency reduction circuit 215 that realizes the current drooping function. The oscillator 200 starts oscillation at the PWM frequency set by the frequency setting circuit 220 when the voltage conversion portion 110 is started up. In addition, the oscillator 200 sets the signal Dmax to logic H during the rising period of the oscillation signal. The one-shot circuit 205 generates a pulse having a smaller width than the signal Dmax in response to the rise of the signal Dmax output from the oscillator 200.

The PWM comparator, an RS flip-flop FF1, an RS flip-flop FF2, and an AND21 function as a pulse width modulation unit that outputs a pulse signal QQ having a pulse width corresponding to a result of comparing at least one of the soft start control voltage (CS voltage) and the feedback signal voltage (FB voltage) with the voltage of the oscillation signal. Based on the CS voltage, the FB voltage, and the oscillation signal from the oscillator 200, the PWM comparator outputs a timing signal indicating the timing at which the drive signal OUT should be logic L for each period of the oscillation signal. Specifically, the PWM comparator outputs a logic H timing signal when the oscillation signal voltage is equal to or lower than the lower one of the CS voltage and the FB voltage in one period of the oscillation signal, and switches the timing signal to logic L in response to the voltage of the oscillation signal exceeding at least one of the CS voltage and the FB voltage. As an example, the PWM comparator according to the present embodiment outputs the pulse signal QQ having a maximum on-duty of 50%.

The FF1 has a set terminal connected to the one-shot circuit 205 and a reset terminal connected to the PWM comparator. The FF1 is set by the pulse from the one-shot circuit 205 at the start of the rising period of the oscillation signal, and is reset by the timing signal from the PWM comparator in response to the oscillation signal voltage exceeding at least one of the CS voltage and the FB voltage. The FF2 has a set terminal connected to the one-shot circuit 205 and a reset terminal connected to a comparator CMP1. The FF2 is set at the start of the rising period of the oscillation signal, and is reset in response to the comparator CMP1 detecting the overcurrent of the switching device Q1. The AND21 takes the logical product of the output of the FF1, the output of the FF2, and the signal Dmax of the oscillator 200 to output it as the signal QQ. The AND21 outputs a signal QQ that becomes logic H from the start of the rising period of the oscillation signal until the oscillation signal voltage exceeds at least one of the CS voltage and the FB voltage or the overcurrent of the switching device Q1 is detected.

An output driver circuit 207 is driven by a power supply voltage VCC, amplifies the signal QQ output from the AND21, to output the amplified signal QQ from the OUT terminal as the drive signal OUT for the switching device Q1. The output driver circuit 207 according to the present embodiment has an enable terminal EN, and when the power supply voltage input from the VCC terminal exceeds a threshold voltage VT22, that is, when the power supply voltage becomes high enough to cause the power supply IC1 to operate, the output from the OUT terminal is enabled.

(2) Circuit Relating to Overload Detection

The comparator CMP1 outputs an IS overload signal IS_OLP that becomes logic H in response to the current flowing through the switching device Q1 exceeding an upper limit current based on the result of comparing the IS voltage and a threshold voltage VT21. The threshold voltage VT21 is set to coincide with the IS voltage input to the IS terminal in a state where the upper limit current is flowing through the switching device Q1. Since the ground potential of the power supply control unit 130 is between the switching device Q1 and the resistor R6, the detection target potential between the resistor R20 and the resistor R14 becomes a negative potential, and the detection target potential drops to the negative side as the current flowing through the switching device Q1 becomes larger. Therefore, the threshold voltage VT21 is set to a negative voltage.

A comparator CMP2 detects whether or not the output voltage Vo of the voltage conversion portion 110 detected by the output voltage detection circuit 120 is less than a lower limit output voltage based on the result of comparing the FB voltage input to the FB terminal and a threshold voltage VthOLP. The comparator CMP2 outputs an FB overload signal FB_OLP that becomes logic H, assuming that the output side of the voltage conversion portion 110 is overloaded, in response to the output voltage of the voltage conversion portion 110 being less than the lower limit output voltage. Since the FB terminal is pulled up to an internal power supply voltage VDD of the power supply IC1 via a resistor R21, when the load is large and the output voltage Vo of the voltage conversion portion 110 falls, the intensity of light output from the photodiode PC1A decreases, the resistance value of the phototransistor PC1B rises, and the FB voltage rises. At this time, the comparator CMP2 sets the FB overload signal FB_OLP to logic H in response to the FB voltage exceeding the threshold voltage VthOLP. This threshold voltage VthOLP may be a voltage higher than the maximum voltage of the oscillation signal output from the oscillator 200. The comparator CMP2 according to the present embodiment may have a hysteresis between the threshold voltage compared at the logic H level and the threshold voltage compared at the logic L level in order to stabilize the logic value of the FB overload signal FB_OLP.

The overload detection circuit 210 detects the overload of the voltage conversion portion 110 in response to the output voltage Vo detected by the output voltage detection circuit 120 being less than the lower limit output voltage. In addition, the overload detection circuit 210 detects the overload of the voltage conversion portion 110 in response to the current flowing through the switching device Q1 exceeding the upper limit current. The overload detection circuit 210 according to the present embodiment generates an overload signal OLP indicating the overload mode of the power supply IC1 and the voltage conversion portion 110 based on the IS overload signal IS_OLP from the comparator CMP1 and the FB overload signal FB_OLP from the comparator CMP2. The overload signal OLP becomes logic H in the overload mode.

(3) Circuit Relating to Setting PWM Frequency

The frequency reduction circuit 215 reduces the PWM frequency of the oscillator 200 in response to the overload being detected during normal operation of the voltage conversion portion 110. The frequency reduction circuit 215 according to the present embodiment receives the overload signal OLP and reduces the PWM frequency of the oscillator 200 in response to the overload mode being entered. The frequency reduction circuit 215 sets/changes the PWM frequency in the overload mode based on the VF voltage of the VF terminal. The frequency reduction circuit 215 according to the present embodiment reduces the PWM frequency of the oscillator 200 in response to a fall in the on-duty of the drive signal OUT of the switching device Q1 and a fall in the VF voltage.

The frequency setting circuit 220 sets the PWM frequency used when starting up the voltage conversion portion 110 to a frequency higher than the minimum frequency according to the overload. The frequency setting circuit 220 according to the present embodiment sets a minimum PWM frequency during startup of the voltage conversion portion 110 according to the CS voltage determined by the setting voltage determination circuit 245 at a predetermined timing after startup of the power supply device 10. The frequency setting circuit 220 receives determination values D1 and D2 of the CS voltage determined by the setting voltage determination circuit 245 from the setting voltage determination circuit 245, and sets the PWM frequency in the oscillator 200 according to the determination values D1 and D2.

(4) Circuit Relating to Initialization of the Power Supply IC1

A comparator CMP3 functions as an undervoltage lockout (UVLO) circuit and detects whether or not the power supply voltage input from the VCC terminal of the power supply IC1 has exceeded the threshold voltage VT22. The threshold voltage VT22 has hysteresis, and in response to the power supply voltage exceeding the threshold voltage VT22, the comparator CMP3 outputs the logic H to start driving the switching device Q1, and in response to the power supply voltage becoming equal to or lower than a threshold voltage VT22-α, the comparator CMP3 switches the output from logic H to logic L and shuts down the power supply IC1. The power supply IC1 continues switching using the charge charged in the capacitor C15 during the period until shut down, thereby supplying power to the secondary side via the transformer T1 and increasing the output voltage Vo, along with generating a voltage in the winding T1d. As a result, by supplying a current from the auxiliary winding T1d to the VCC terminal and the capacitor C15 via the diode D4, and maintaining the VCC terminal voltage, it is possible for the power supply control portion 130 to continue switching of the switching device Q1.

The internal power supply 225 generates the internal power supply voltage VDD (for example, 5 V) of the power supply IC1 when the power supply voltage input from the VCC terminal has exceeded the threshold voltage VT22, and supplies it to each portion in the power supply IC1. The initialization circuit 230 outputs a pulse of an initialization signal ini_reset that becomes logic H for a predetermined period in response to the start of the internal power supply 225 supplying the internal power supply voltage VDD. In response to the pulse of the initialization signal ini_reset, the timer circuit 235 outputs a CS discharge signal that becomes logic H during a predetermined period (1 ms in the present figure) in which the capacitor C9 connected to the CS terminal can be sufficiently discharged. In addition, the timer circuit 235 supplies the one-shot circuit 240 with the timing when the CS discharge signal changes to logic L after the predetermined period.

(5) Circuit Relating to Setting/Obtainment of CS Voltage

A MOS transistor MN1, a current source CS21, a current source CS22, a MOS transistor MP1, the one-shot circuit 240, and a NOT21 function as a soft start control voltage output portion for outputting a soft start control voltage for starting up the voltage conversion portion 110 by a soft start. The MOS transistor MN1 is, for example, an nMOS transistor, and is turned on in response to the CS discharge signal from an OR21 becoming logic H, and discharges the CS voltage to the ground. It is noted that in the present embodiment, the MOS transistor indicated by the symbol MP may be, for example, a pMOS transistor, and the MOS transistor indicated by the symbol MN may be, for example, an nMOS transistor. The current source CS21 charges the soft start capacitor with the soft start current in response to startup of the voltage conversion portion 110. The soft start control voltage (CS voltage) thus obtained is supplied to the PWM comparator.

The current source CS22 is used to supply, to the CS terminal, a setting obtainment current larger than the soft start current that is made to flow by the current source CS21. The MOS transistor MP1 switches whether or not to supply the setting obtainment current from the current source CS22 to the CS terminal. The MOS transistor MP1 is turned on in response to the logic L input to its gate. The one-shot circuit 240 receives the timing when the CS discharge signal of the timer circuit 235 changes to logic L, and generates a one-shot pulse of a predetermined width at which the setting obtainment current can be made to flow through the resistor Rset and the voltage generated in the resistor Rset can be read out. The NOT21 inverts the one-shot pulse generated by the one-shot circuit 240 and turns on the MOS transistor MP1 during the one-shot pulse period. As a result, prior to startup of the voltage conversion portion 110, the soft start control voltage output portion can cause the setting obtainment current larger than the soft start current to flow to the soft start terminal (CS terminal) that is connected to the soft start capacitor C9. Here, the setting obtainment current is the sum of the currents flowing through the current source CS21 and the current source CS22, and may be, for example, 10 times the soft start current.

The setting voltage determination circuit 245 is connected to the CS terminal, and determines the CS voltage obtained in response to the current source CS21 and the current source CS22 causing the setting obtainment current to flow. As an example, the setting voltage determination circuit 245 according to the present embodiment outputs the CS voltage determination values D1 and D2 corresponding to the setting obtainment current. The determination value D1 becomes logic H when the CS voltage exceeds VT51, and becomes logic L when the voltage is VT51 or less. The determination value D2 becomes logic H when the CS voltage exceeds VT52 (VT52>VT51), and becomes logic L when the voltage is VT52 or less. In addition, the setting voltage determination circuit 245 supplies the obtainment timing of the determination values D1 and D2 and the like to the CS discharge control circuit 250.

As a result of the setting voltage determination circuit 245 obtaining the determination values D1 and D2, the CS discharge control circuit 250 temporarily discharges the soft start capacitor C9 in response to the minimum PWM frequency during startup of the voltage conversion portion 110 being set. Specifically, in response to the setting voltage determination circuit 245 obtaining the determination values D1 and D2, the CS discharge control circuit 250 outputs the logic H CS discharge signal to discharge the capacitor C9 to a predetermined voltage. The CS discharge control circuit 250 may output the logic H CS discharge signal until the CS voltage becomes equal to or lower than the lower limit voltage of the oscillation signal of the oscillator 200. The OR21 takes the logical sum of the CS discharge signal from the timer circuit 235 and the CS discharge signal from the CS discharge control circuit 250 and supplies it to the gate of the MOS transistor MN1.

(6) Circuit Relating to Setting of FB Voltage

The resistor R21 is connected between the internal power supply voltage VDD and the FB terminal of the power supply IC1, and pulls up the FB terminal. As a result, the resistor R21 stabilizes the voltage at the FB terminal even when the phototransistor PC1B is off.

A transistor NPN1, a resistor R22, a current source CS23, a transistor PNP1, and a MOS transistor MN2 constitute a pull up circuit for pulling up the FB voltage at startup of the voltage conversion portion 110 until the voltage becomes higher than the threshold voltage VthOLP of the comparator CMP2, and setting the power supply IC1 to the overload mode. The transistor NPN1 and the resistor R22 are connected in series between the power supply voltage VCC and the FB terminal, and switch whether or not the FB terminal is pulled up by the resistor R22 according to the base voltage of the transistor NPN1. Here, the resistor R22 has a resistance value lower than that of the resistor R21 such as 1/10 of the resistor R21, and supplies, to the FB terminal, a pull-up current larger than the pull-up by the resistor R21.

The current source CS23 and the transistor PNP1 are connected in series between the power supply voltage VCC and the ground of the power supply IC1, and the base of the transistor NPN1 is connected between the current source CS23 and the transistor PNP1. The base of the transistor PNP1 is connected to the internal power supply voltage VDD. As a result, the current source CS23 and the transistor PNP1 set the base of the transistor NPN1 to a high level in response to the MOS transistor MN2 being turned off, and pull up the FB terminal by the transistor NPN1 and the resistor R22. The MOS transistor MN2 has a drain-source connection between the transistor NPN1 and the ground of the power supply IC1, and a gate connected to the output Q of an RS flip-flop RS_FF3. The MOS transistor MN2 is turned on when the output Q is logic H, and turns off the gate of the transistor NPN1 as a low level. In addition, the MOS transistor MN2 is turned off when the output Q is logic L, turns on the gate of the transistor NPN1 as the high level, and causes the FB terminal to be pulled up by the resistor R22.

The RS_FF3 is a circuit that controls the base of the MOS transistor MN2 to pull up the FB voltage when startup of the voltage conversion portion 110 is started. The RS_FF 3 inputs the overload signal OLP to a set terminal S, and inputs the initialization signal ini_reset output from the initialization circuit 230 to a reset terminal R. When the supply of the internal power supply voltage VDD of the power supply IC1 is started, the RS_FF 3 receives the logic H pulse of the initialization signal ini_reset and sets the output Q to logic L. As a result, the MOS transistor MN2 is turned off, and the FB terminal is pulled up by the resistor R22. When the FB voltage exceeds the threshold voltage VthOLP, the comparator CMP2 sets the FB overload signal FB_OLP to logic H, and the overload detection circuit 210 sets the overload signal OLP to logic H. In response, the RS_FF 3 sets the output Q to logic H. As a result, the MOS transistor MN2 is turned off, and the pull-up of the FB terminal by the resistor R22 is completed.

Figure 3:
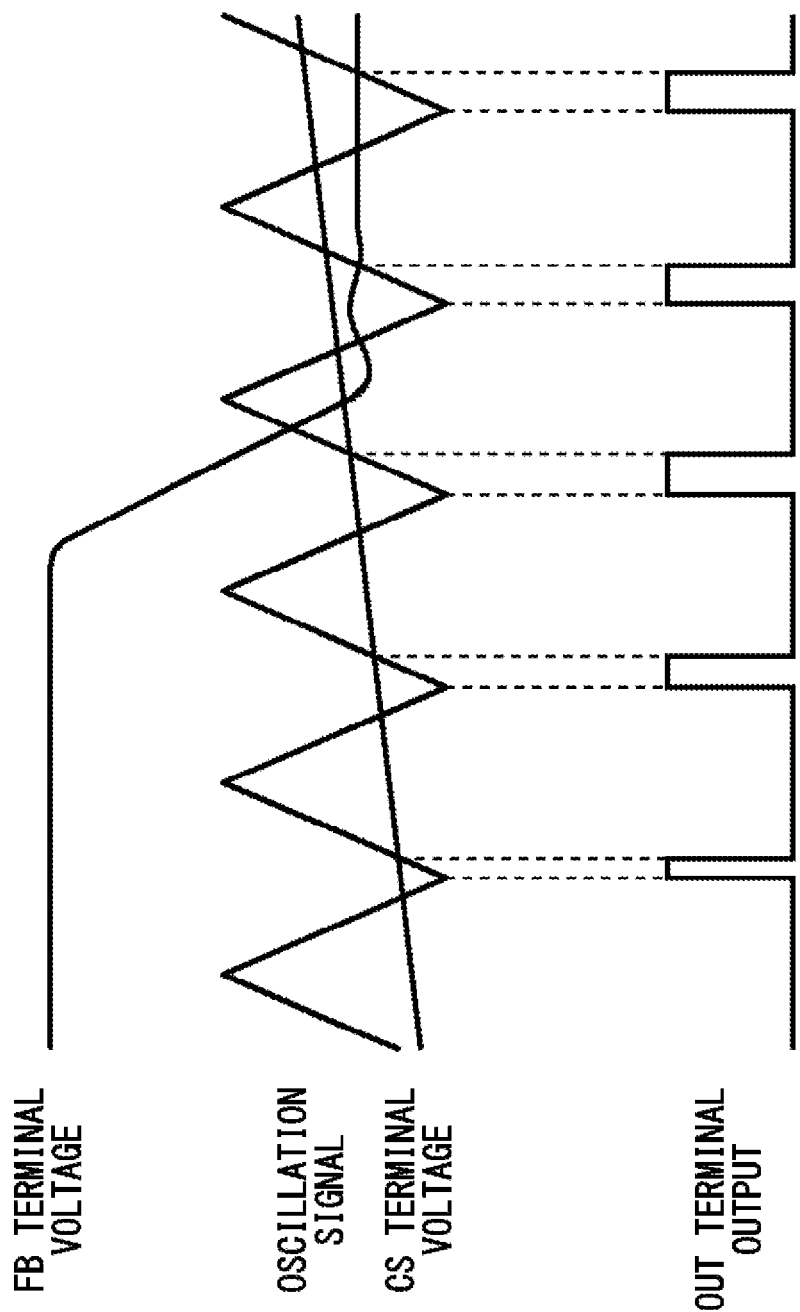
FIG. 3 shows a PWM control waveform of the power supply device 10 according to the present embodiment.

FIG. 3 shows a PWM control waveform of the power supply device 10 according to the present embodiment. The power supply IC1 pulls up the FB terminal by the resistor R22 at the time of initialization to make the FB voltage the maximum voltage. In addition, the power supply IC1 obtains the CS voltage determination values D1 and D2, and then discharges the capacitor C9 connected to the CS terminal to make the CS voltage equal to or lower than the lower limit voltage of the oscillation signal. Thereafter, the power supply IC1 gradually charges the capacitor C9 and gradually increases the CS voltage as shown in the present figure.

The PWM comparator, during each period of the oscillation signal from when the oscillation waveform starts rising until the oscillation waveform is equal to or lower than the lower one of the FB voltage and the CS voltage, outputs a timing signal that becomes logic H. As a result, the output driver circuit 207 outputs the drive signal OUT shown in the present figure from the OUT terminal. In the present figure, since the CS voltage is lower than the FB voltage until the third pulse of the drive signal OUT, the PWM comparator outputs the timing signal that becomes logic H from when the oscillation waveform starts rising until the oscillation waveform is equal to or lower than the CS voltage. Then, the output driver circuit 207 outputs the drive signal OUT corresponding to this timing signal.

As the CS voltage rises, the output driver circuit 207 gradually outputs the drive signal OUT having a large pulse width during the ON period. As a result, when the output voltage Vo of the voltage conversion portion 110 rises, the phototransistor PC1B is released from a cutoff state by an optical feedback signal from the photocoupler PC1A. As a result, the FB voltage becomes a voltage corresponding to the output voltage Vo.

When the CS voltage further rises and exceeds the FB voltage, the PWM comparator outputs, during each period of the oscillation signal, the timing signal that becomes logic H from the start of the rise of the oscillation waveform until when the oscillation waveform is equal to or less than the FB voltage, and the driver circuit 207 outputs the drive signal OUT corresponding to this timing signal (during or after the fourth period of the drive signal OUT). Thereby, the power supply device 10 completes startup and shifts to normal operation.

Figure 4:
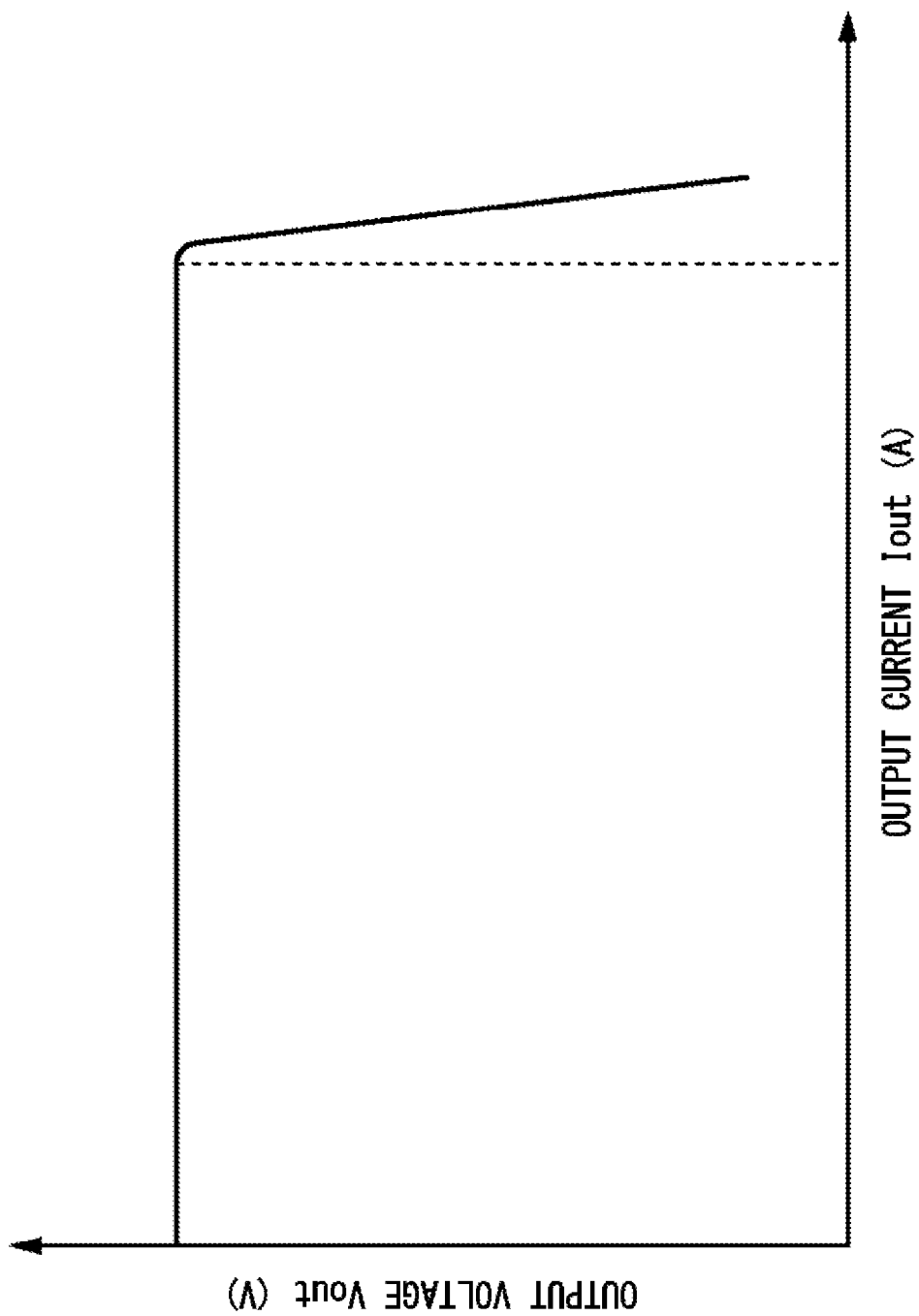
FIG. 4 shows a current drooping characteristic of the power supply device 10 according to the present embodiment.

FIG. 4 shows current drooping characteristics of the power supply device 10 according to the present embodiment. In a rated range of the output current of the voltage conversion portion 110, the power supply IC1 performs feedback control to bring the output voltage Vo close to the target voltage. The current that flows when the switching device Q1 is turned on rises as the output current of the voltage conversion portion 110 rises, that is, as the output power of the voltage conversion portion 110 rises.

When the current flowing through the switching device Q1 exceeds the upper limit current, the comparator CMP1 outputs the IS overload signal IS_OLP, resets the FF2 for each pulse of the drive signal OUT, and reduces the pulse width of the drive signal OUT. As a result, power supply IC1 reduces the output power of the voltage conversion portion 110 if the output current of the voltage conversion portion 110 exceeds the rating.

However, by only reducing the pulse width of the drive signal OUT supplied to the switching device Q1, although the output voltage Vo of the voltage conversion portion 110 falls as the output power of the voltage conversion portion 110 falls, there is a possibility that the output current may rise instead of being suppressed. That is, although the output voltage Vo falls when the output current exceeds the rating, there is a possibility that the output current rises gently downward and rightward in the graph of the present figure. When the output current rises in this way, there is a possibility that the secondary side device of the voltage conversion portion 110 may be damaged.

In the power supply IC1 according to the present embodiment, the frequency reduction circuit 215 lowers the PWM frequency in response to the detection of the overload, thereby further reducing the on-period ratio of the drive signal OUT. For example, the frequency reduction circuit 215 may reduce the PWM frequency of the oscillator 200 to a minimum of $\frac{1}{5}$ to $\frac{1}{20}$, that is, for example, $\frac{1}{10}$ of the frequency in the normal mode. As a result, the power supply IC1 can significantly reduce the output power of the voltage conversion portion 110, and can prevent the output current from rising greatly while reducing the output voltage Vo of the voltage conversion portion 110, as shown in the graph of the present figure.

FIG. 5 shows the configuration of the setting voltage determination circuit 245 and the CS discharge control circuit 250 according to the present embodiment. The setting voltage determination circuit 245 determines the CS voltage obtained in response to the setting obtainment current flowing through the CS terminal during the one-shot pulse period of the one-shot circuit 240. The setting voltage determination circuit 245 includes comparators Cp1 and Cp2 and Csend, an inverter (logic inversion device) INV51, an OR51, D flip-flops DFF1 to DFF3, and AND51 to AND52. The comparators Cp1 and Cp2 and Csend each have a positive terminal connected to the CS terminal, and a negative terminal connected to respective threshold voltages VT51 to VT53 (where VT51<VT52<VT53), and when the CS voltage input to each positive terminal is higher than the threshold value, output logic H, and when the CS voltage is equal to or lower than the threshold voltage, output logic L. Here, the threshold voltage VT52 may be equal to the minimum voltage of the oscillation signal output from the oscillator 200. When the threshold voltage for obtaining the determination value is different from the minimum voltage of the oscillation signal, the setting voltage determination circuit 245 may include an exclusive comparator for determining each. In addition, the threshold voltage VT53 may be set as the maximum value of the CS voltage, and may be equal to or higher than the maximum voltage of the oscillation signal output from the oscillator 200.

The INV51 inverts the logical value of the one-shot pulse output from the one-shot circuit 240. The OR51 takes the logical sum of the output of the comparator Csend and the initialization signal ini_reset. The DFF3 is reset when the output of the OR51 is input to an R terminal (reset terminal) and the initialization signal ini_reset is input thereto, or when the CS voltage reaches the maximum value (CS voltage>threshold voltage VT53), and thereby outputs the logic H that is an inverted value from the QB output. In addition, the DFF3 latches the logic H input to a D terminal at the falling timing of the output of the INV51, that is, the one-shot pulse output from the one-shot circuit 240, and sets the QB output to the logic L that is an inverted value. The delay circuit 510 delays the inversion pulse of the one-shot pulse output from the INV51 by a small amount of time.

The DFF1 and DFF2 input the outputs of the comparators Cp1 and Cp2 to their respective D terminals and input the QB output of the DFF3 to their respective R terminals. The DFF1 and DFF2 are reset by the initialization signal ini_reset. The DFF1 and DFF2 latch the outputs of the comparators Cp1 and Cp2 at a timing that is delayed by a small amount of time from the output of the delay circuit 510, that is, the falling timing of the one-shot pulse output from the one-shot circuit 240. In addition, the DFF1 and DFF2 are reset in response to the CS voltage exceeding the threshold voltage VT53 and the power supply device 10 entering the normal mode.

The AND51 is connected to the Q output of the DFF1 and the QB output of the DFF2, and when the DFF1 latches the logic H and the DFF2 latches the logic L, that is, when a CS voltage that is more than the VT51 and the VT52 or less is detected, the AND51 outputs the determination value D1 of the logic H. An AND52 is connected to the Q output of DFF1 and the Q output of the DFF2, and when the DFF1 latches logic H and the DFF2 latches logic H, that is, when a CS voltage exceeding the VT52 is detected, the AND52 outputs the determination value D2 of the logic H. Therefore, the setting voltage determination circuit 245 outputs the determination value (D1, D2)=(L, L) when the detected CS voltage is the VT51 or less, (D1, D2)=(H, L) when the detected CS voltage is more than the VT51 and the VT52 or less, and the determination value (D1, D2)=(H, H) when the value exceeds the VT52. In the above, the setting voltage determination circuit 245 outputs the determination values D1 and D2 in three stages, but instead, the setting voltage determination circuit 245 may output the determination values in two stages or four or more stages.

The CS discharge control circuit 250 temporarily discharges the soft start capacitor in response to the minimum PWM frequency having been set. The CS discharge control circuit 250 includes an INV52, an AND53, an OR52, a delay circuit 520, and a D flip-flop DFF4. The INV52 logically inverts the output of the comparator Cp2. In the present embodiment, the threshold voltage VT52 of the comparator Cp2 is set to the minimum voltage of the oscillation signal, and the output of the INV52 becomes logic H in response to the CS voltage becoming equal to or lower than the minimum voltage of the oscillation signal.

The AND53 outputs the logical product of the output of the INV52 and the overload signal OLP. That is, the AND53 outputs the logic H when the CS voltage is equal to or lower than the minimum voltage of the oscillation signal and the overload signal OLP indicates the overload. The OR52 outputs a logical sum of the output of the AND53 and the initialization signal ini_reset. The delay circuit 520 delays the output of the delay circuit 510 by a small amount of time. The DFF4 inputs the logic H to a D terminal, inputs the output of the OR52 to an R terminal, and outputs the CS discharge signal from a Q terminal. The DFF4 is reset in response to the initialization signal ini_reset, is set by the output of the delay circuit 520 after a small amount of time after the DFF1 and DFF2 in the setting voltage determination circuit 245 latch the detection result of the CS voltage, to output the CS discharge signal of the logic H. Then, in response to the CS voltage being discharged to the minimum voltage of the oscillation signal based on the output of the AND53, and the overload signal OLP becoming the value (logic H) indicating the overload by pulling up the FB terminal, the DFF4 sets the CS discharge signal to logic L and ends discharge.

Figure 6:
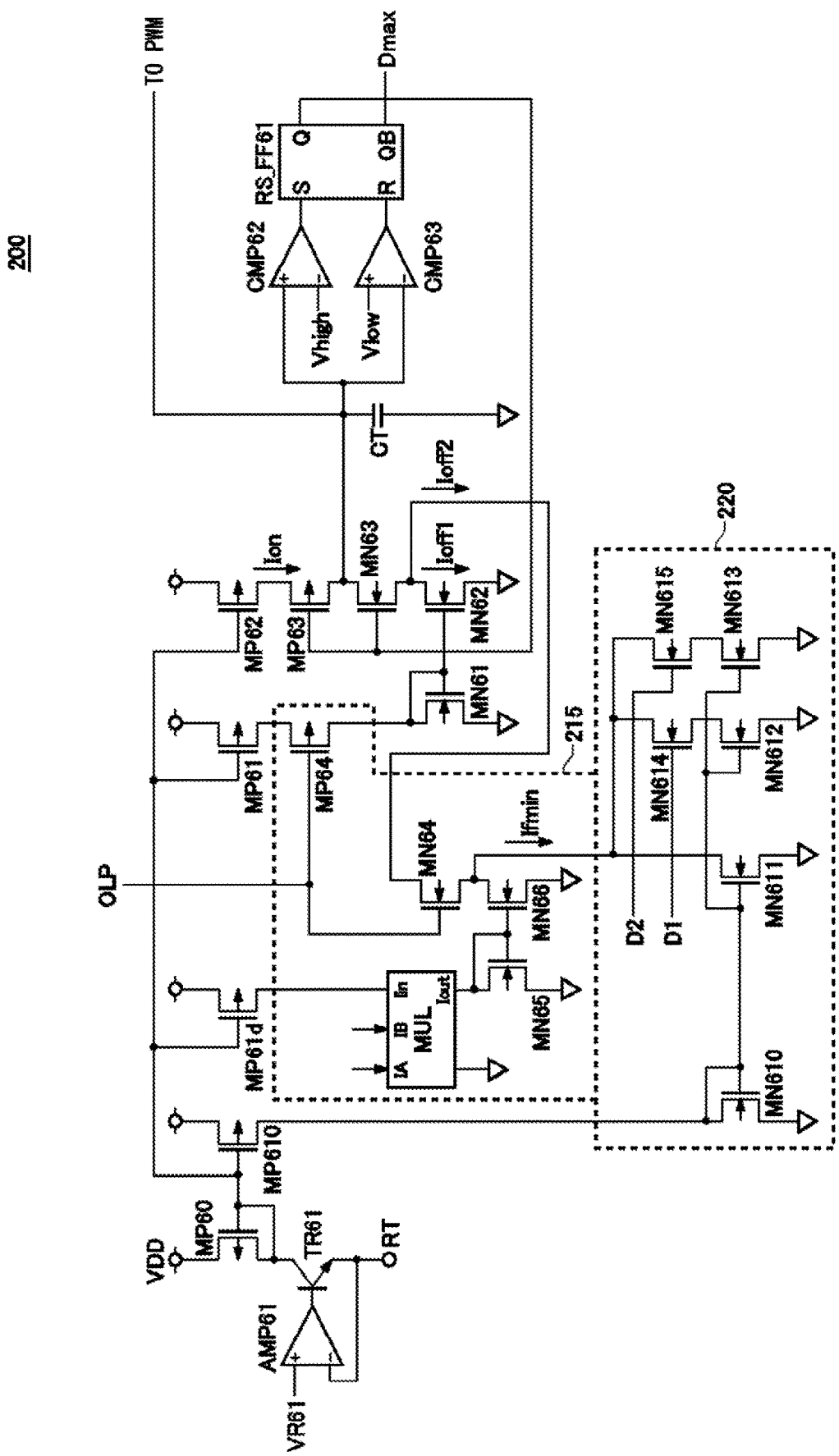
FIG. 6 shows a configuration of an oscillator 200 together with a frequency reduction circuit 215 and a frequency setting circuit 220 according to the present embodiment.

FIG. 6 shows the configuration of the oscillator 200 according to the present embodiment together with the frequency reduction circuit 215 and the frequency setting circuit 220. The oscillator 200 includes a transistor TR61, an operational amplifier AMP61, MOS transistors MP60 to MP63, MP61d, and MP610, MOS transistors MN61 to MN63, a capacitor CT, comparators CMP62 to CMP63, and an RS flip-flop RS_FF61.

The transistor TR61 and the operational amplifier AMP61 set a reference current that flows through the MOS transistor MP60. The transistor TR61 is, for example, an NPN transistor, and a drain-source connection is made between the power supply potential VDD and an RT terminal of the oscillator 200. In the operational amplifier AMP61, a reference voltage VR61 is input to its positive terminal, the negative terminal is connected to its RT terminal, and the output is connected to the base of the transistor TR61. The operational amplifier AMP61 controls the reference current flowing through the transistor TR61 so that the voltage generated in the resistor R12 connected to the RT terminal becomes the reference voltage VR61.

In the MOS transistor MP60, a drain-source connection is made between the power supply potential VDD of the oscillator 200 and the transistor TR61, and its gate and source are connected. Thereby, the MOS transistor MP60 controls the gate potential exactly so that the reference current flows. The MOS transistors MP61, MP62, MP61d, and MP610 constitute a current mirror circuit together with the MOS transistor MP60. The MOS transistors MP61, MP62, MP61d, and MP610 have a drain connected to the power supply potential VDD, a gate connected to the gate of the MOS transistor MP60, and respectively cause a mirror current that is equal to or a constant multiple of the reference current flowing through the MOS transistor MP60 to flow. The MOS transistor MP62 causes a charge current Ion used for charging the capacitor CT to flow as the mirror current.

In the MOS transistor MN61, a drain-source connection is made in series with the MOS transistor MP61 between the power supply potential VDD and the ground, and the potential between the MOS transistors MP61 and MN61 is input to its gate. The gate voltage of the MOS transistor MN61 is a voltage that allows a mirror current flowing through the MOS transistor MP61 to flow to the ground when a MOS transistor MP64 provided between the MOS transistor MP61 and the MOS transistor MP61 is on. In the MOS transistor MN62, a drain-source connection is made in series with the MOS transistor MP62 between the power supply potential VDD and the ground, a gate is connected to the gate of the MOS transistor MN61, and the MOS transistor MN62 causes a mirror current that is equal to or a constant multiple of the mirror current flowing through the MOS transistor MN61 to flow. As a result, the MOS transistor MN62 causes a discharge current Ioff1 used for discharging the capacitor CT to flow as the mirror current. In the present embodiment, the charge current Ion by the MOS transistor MP62 and the discharge current Ioff1 by the MOS transistor MN62 are set to be substantially the same current.

The MOS transistor MP63, the MOS transistor MN63, the comparator CMP62, the comparator CMP63, and the RS_FF61 raise the oscillation signal corresponding to the voltage of the capacitor CT to a predetermined upper limit voltage by supplying a charge current to the capacitor CT, and by discharging the discharge current from the capacitor, function as a charge/discharge circuit that lowers the oscillation signal to a predetermined lower limit voltage.

In the MOS transistor MP63, a drain-source connection is made between the MOS transistor MP62 and the positive terminal of the capacitor CT, and when the Q output of the FF61 input to the gate is logic L, the MOS transistor MP63 is turned on and supplies the charge current Ion to the capacitor CT. In the MOS transistor MN63, a drain-source connection is made between the positive terminal of the capacitor CT and the MOS transistor MN62, and when the Q output of the RS_FF61 input to the gate is logic H, the MOS transistor MN63 is turned on and discharges the discharge current Ioff (Ioff1 or Ioff2) from the capacitor CT. In the capacitor CT, the positive side is connected between the MOS transistor MP63 and the MOS transistor MN63, and the negative side is connected to the ground of the oscillator 200. When the Q output of the RS_FF61 is logic L, the capacitor CT is charged by the charge current Ion, and when the Q output of the RS_FF61 is logic H, the capacitor CT discharges the discharge current Ioff.

In the comparator CMP62, the positive voltage of the capacitor CT is input to the positive terminal, an upper limit voltage Vhigh of the oscillation signal is input to the negative terminal, and the comparator CMP62 outputs the logic H in response to the positive voltage of the capacitor CT exceeding the upper limit voltage Vhigh. In the comparator CMP63, a lower limit voltage Vlow of the oscillation signal is input to the positive side terminal, the positive side voltage of the capacitor CT is input to the negative side terminal, and the comparator CMP63 outputs the logic H in response to the positive side voltage of the capacitor CT becoming the lower limit voltage Vlow. The RS_FF61 is set in response to the comparator 62 outputting the logic H, and is reset in response to the comparator 63 outputting the logic H. As a result, when the positive voltage of the capacitor CT is equal to or lower than the lower limit voltage Vlow, the RS_FF61 sets the Q output to the logic L, turns on the MOS transistor MP63, and turns off the MOS transistor MN63 to charge the capacitor CT. In addition, when the positive voltage of the capacitor CT exceeds the upper limit voltage Vhigh, the RS_FF61 sets the Q output to the logic H, turns off the MOS transistor MP63, and turns on the MOS transistor MN63 to discharge the capacitor CT. Then, the voltage on the positive side of the capacitor CT is output as the oscillation signal. In addition, the QB output of the RS_FF61 is an inverted value of the Q output, and is output as the signal Dmax that becomes the logic H during charging of the capacitor CT and becomes the logic L during discharging of the capacitor CT.

The frequency reduction circuit 215 reduces the PWM frequency of the oscillator 200 in response to receiving the overload signal OLP of the logic H. In response to receiving the overload signal OLP of the logic H, the frequency reduction circuit 215 according to the present embodiment switches the discharge current of the capacitor CT to the Ioff2 that is smaller than the Ioff1, thereby extending the discharge time of the capacitor CT. As a result, the frequency reduction circuit 215 can reduce the PWM frequency by lengthening the period of the oscillation signal. Alternatively, the frequency reduction circuit 215 may take a configuration in which the charging current of the capacitor CT is reduced, or may have a configuration in which both the charging current and the discharging current are reduced.

The frequency reduction circuit 215 includes the MOS transistor MP64, MOS transistors MN64 to MN66, and a multiplier MUL. In the MOS transistor MP64, a drain-source connection is made between the MOS transistor MP61 and the MOS transistor MN61. When the overload signal OLP is the logic L, the MOS transistor MP64 is turned on to cause the mirror current flowing through the MOS transistor MP61 to flow to the MOS transistor MN61 and cause the discharge current Ioff1 to flow to the MOS transistor MN62. In addition, the MOS transistor MP64 is turned off when the overload signal OLP is the logic H, thereby turning off the MOS transistor MN62 and setting the discharge current Ioff1 to zero.

The MOS transistor MN64 has a drain-source connection that is made in series with the MOS transistor MN66 between the positive terminal of the capacitor CT in the MOS transistor MN62 and the ground. The MOS transistor MN64 is turned off when the overload signal OLP is the logic L, so that the discharge current Ioff2 does not flow to the MOS transistor MN66. In addition, the MOS transistor MN64 is turned on when the overload signal OLP is the logic H, so that the discharge current Ioff2 flows to the MOS transistor MN66.

The multiplier MUL outputs a current Iout to be input to a Iin terminal from an Iout terminal in response to a mirror current (current Iin) flowing through the MOS transistor MP61d, a current input to the IA terminal (current IA), and a current input to the IB terminal (current IB). The multiplier MUL according to the present embodiment performs an operation of Iout=Iin×IB/IA. In the MOS transistor MN65, a drain-source connection is made between the Iout terminal of the multiplier MUL and the ground, and a gate is connected to the Iout terminal. The gate of the MOS transistor MN65 has a voltage that allows the Iout current to flow through the MOS transistor MN65. The MOS transistor MN66 is connected between the MOS transistor MN64 and the ground, and a gate is connected to the gate of the MOS transistor MN65. As a result, the MOS transistor MN66 causes a mirror current that is equal to or a constant multiple of the current flowing through the MOS transistor MN65 to flow.

The frequency reduction circuit 215 described above is capable of changing the discharge current Ioff2 of the capacitor CT in the overload mode by changing the magnitude of at least one of the current IA and the current IB. A circuit for causing the current IA and the current IB to flow will be described later.

The frequency setting circuit 220 sets the minimum PWM frequency during startup of the voltage conversion portion 110 according to the voltage of the soft start terminal determined by the setting voltage determination circuit 245. The frequency setting circuit 220 according to the present embodiment sets the minimum PWM frequency by controlling the amount of discharge current of the capacitor CT. Alternatively, the frequency setting circuit 220 may control the charging current of the capacitor CT or the current amounts of both the discharging current and the charging current.

In the overload mode, the frequency setting circuit 220 according to the present embodiment is connected in parallel with the frequency reduction circuit 215 between the MOS transistors MN62 and MN63. The frequency setting circuit 220 sets the discharge current Ioff2 obtained by adding a current Ifmin that is made to flow through the frequency setting circuit 220 to a current that is made to flow through the MOS transistor MN66 of the frequency reduction circuit 215, thereby setting the minimum frequency of PWM during the startup of the voltage conversion portion 110.

An MOS transistor MN610 has a drain-source connection between the MOS transistor MP610 and the ground, and a gate connected to the MOS transistor MP610 side. The gate of the MOS transistor MN610 has a voltage that allows the mirror current from the MOS transistor MP610 to flow. In MOS transistors MN611 to MN613, drain-source connections are made in parallel between the MOS transistor MN64 and the ground, and gates are connected to the gate of the MOS transistor MN610. Each of the MOS transistors MN611 to MN613 causes a mirror current that is equal to or a constant multiple of the mirror current flowing through the MOS transistor MP610 to flow.

An MOS transistor MN614 has a drain-source connection that is made between the MOS transistors MN64 and MN612, and receives the determination value D1 at its gate. The MOS transistor MN614 is turned on in response to receiving the logic H determination value D1 so that the mirror current flows through the MOS transistor MN612. An MOS transistor MN615 has a drain-source connection that is made between the MOS transistors MN64 and MN613, and receives the determination value D2 at its gate. The MOS transistor MN614 is turned on in response to receiving the logic H determination value D2 so that the mirror current flows through the MOS transistor MN613.

The frequency setting circuit 220 described above sets the current Ifmin to the mirror current of the MOS transistor MN611 when (D1, D2)=(L, L), to the total mirror current of the MOS transistors MN611 to MN612 when (D1, D2)=(H, L). and to the total mirror current of the MOS transistors MN611 to MN613 when (D1, D2)=(H, H). The discharge current Ioff2 in the overload mode is the sum of the mirror current of the MOS transistor MN66 and the current Ifmin. Here, in an overload mode entered due to the overload generated during normal operation, the setting voltage determination circuit 245 sets (D1, D2)=(L, L). On the other hand, when the voltage conversion portion 110 is started up, the setting voltage determination circuit 245 can set (D1, D2)=(H, L) or (H, H) according to the value of the resistor Rset. Therefore, in the overload mode entered when starting up the voltage conversion portion 110, the power supply IC1 can raise the discharge current Ioff2 to be larger and raise the PWM frequency to be higher than those in the overload mode caused by the overload generated during normal operation.

It is noted that the power supply IC1 may set the maximum value of the discharge current Ioff2 to a value smaller than the discharge current Ioff1. As a result, it is possible to prevent the PWM frequency from becoming higher than that in the normal mode during startup of the voltage conversion portion 110 or in the overload mode.

Figure 7:
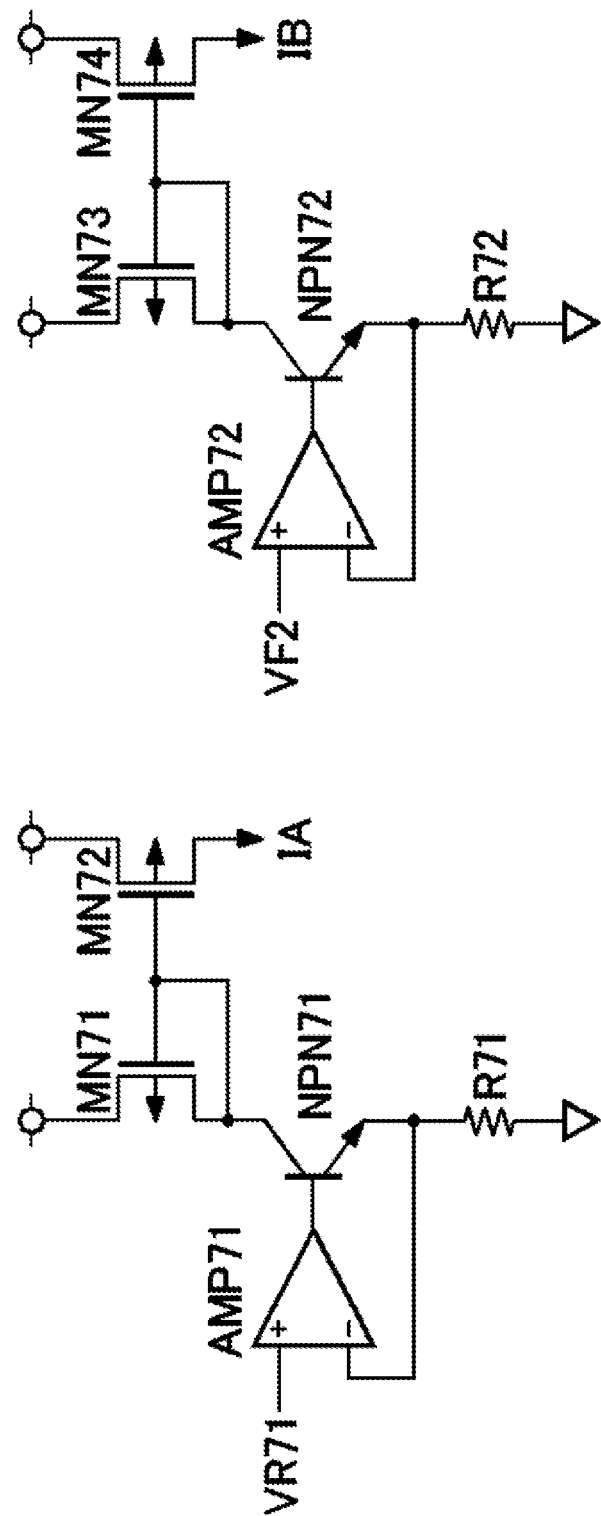
FIG. 7 shows a configuration for generating a current IA and a current IB in the frequency reduction circuit 215 according to the present embodiment.

FIG. 7 shows a configuration for generating the current IA and the current IB included in the frequency reduction circuit 215 according to the present embodiment. The circuit for generating the current IA on the left side of the figure includes a transistor NPN71, a resistor R71, an operational amplifier AMP71, and MOS transistors MN71 to MN72. The drain-source connection of the transistor NPN71 and the resistor R71 are connected between the power supply potential and the ground of the power supply IC1. The operational amplifier AMP71 has a positive input terminal connected to a reference voltage VR71, a negative input terminal connected between the transistor NPN71 and the resistor R71, and an output terminal connected to the base of the transistor NPN1. The operational amplifier AMP71 controls the voltage at the base of the transistor NPN1 so that the voltage applied to the resistor R71 matches the reference voltage VR71. As a result, the resistor R71 causes a current corresponding to (reference voltage VR71)/(resistance value of the resistor R71) to flow.

The MOS transistors MN71 to MN72 are current mirror circuits, and cause a mirror current IA that is equal to or a constant multiple of the current flowing through the resistor R71 to flow via the MOS transistor MN71 to the MOS transistor MN72.

The circuit for generating the current IB on the right side of the figure includes a transistor NPN72, a resistor R72, an operational amplifier AMP72, and MOS transistors MN73 to MN74. The circuit that generates the current IB is a circuit that generates the current IA by using a voltage VF2 instead of the reference voltage VR71. The connection relationship and function of each device correspond to those in the circuit that generates the current IA.

Figure 8:
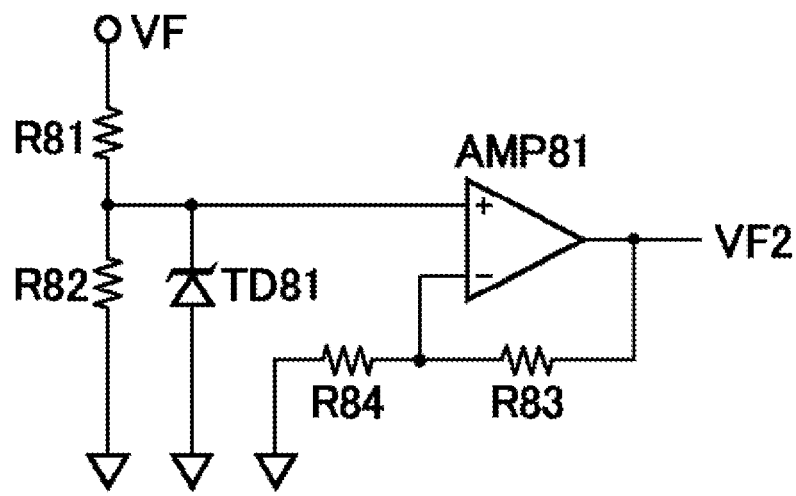
FIG. 8 shows a conversion circuit of a VF voltage used in the frequency reduction circuit 215 according to the present embodiment.

FIG. 8 shows a VF voltage conversion circuit used in the frequency reduction circuit 215 according to the present embodiment. The conversion circuit of the present figure includes resistors R81 to R84, a Zener diode TD81, and an operational amplifier AMP81.

The resistors R81 and R82 resistance-divide the VF voltage input from the VF terminal. The Zener diode TD81 clamps the voltage divided by the resistors R81 and R82 so that it does not exceed the breakdown voltage. The resistors R83 and R84 resistance-divide the voltage VF2 output from the operational amplifier AMP81. The operational amplifier AMP81 constitutes a non-inverting amplifier circuit, and controls the VF2 voltage so that the VF voltage divided by the resistors R81 and R82 and the VF2 voltage divided by the resistors R83 and R84 are equal. The operational amplifier AMP81 according to the present embodiment controls the VF2 voltage so that VF2=(R83+R84)/R84×R82/(R81+R82)×VF.

As a result, the conversion circuit of the present figure can output the VF2 voltage obtained by multiplying the VF voltage by a voltage ratio determined by the resistors R81 to R84 set in advance.

Figure 9:
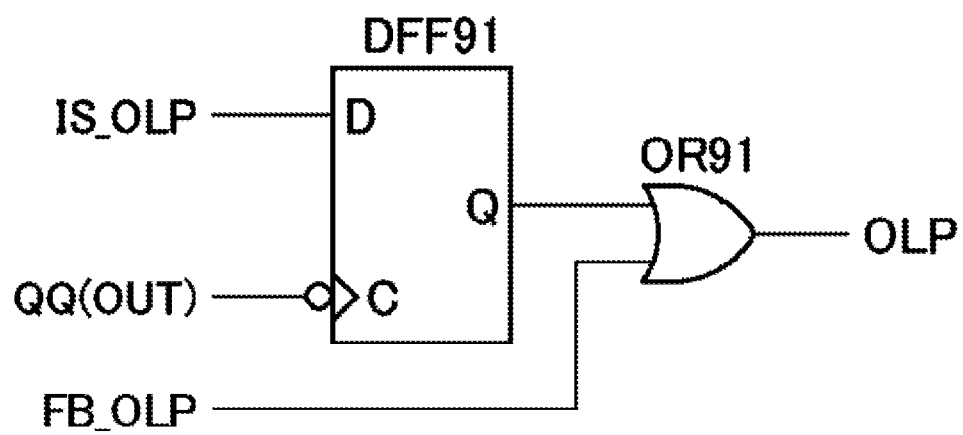
FIG. 9 shows a configuration of an overload detection circuit 210 according to the present embodiment.

FIG. 9 shows a configuration of the overload detection circuit 210 according to the present embodiment. The overload detection circuit 210 detects the overload of the power supply portion 10 when the overcurrent flows through the switching device Q1 or when the output voltage Vo of the voltage conversion portion 110 becomes less than the lower limit output voltage. The overload detection circuit 210 includes a D flip-flop DFF91 and an OR91. The DFF91 inputs the IS overload signal IS_OLP to a D terminal, inputs the signal QQ (or drive signal OUT) to an inverted clock terminal, and latches the IS overload signal IS_OLP at the falling timing of the signal QQ. The OR91 calculates the logical sum of the Q output of the D flip-flop DFF91 and the FB overload signal FB_OLP and outputs it as the overload signal OLP.

As a result, the overload detection circuit 210 sets the overload signal OLP to the logic H when the IS overload signal IS_OLP becomes logic H at the end of the most recent ON period of the switching device Q1 or when the FB overload signal is logic H.

Figure 10:
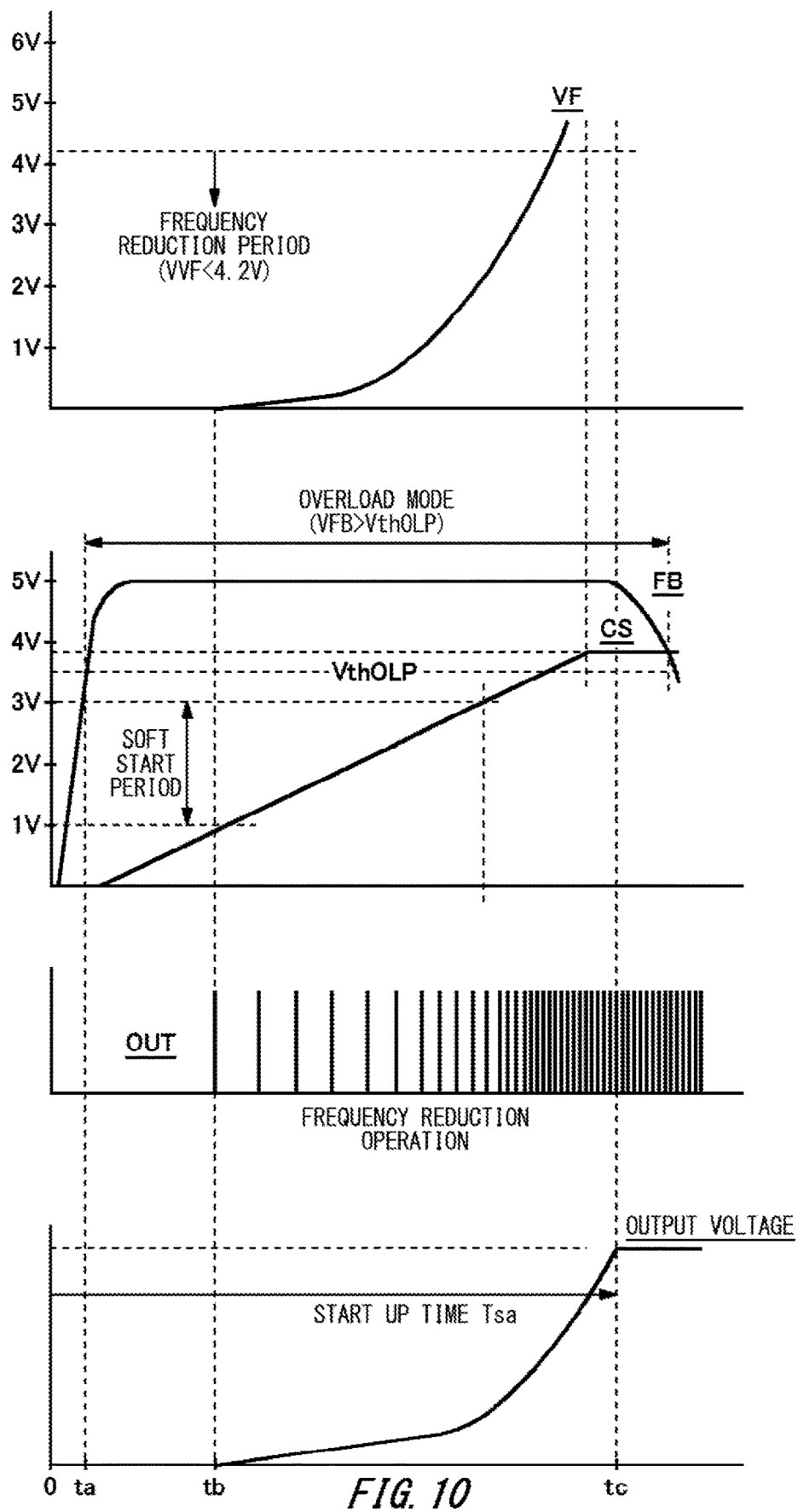
FIG. 10 shows an operation waveform at the time of startup of a power supply device of a comparative example of the present embodiment.

FIG. 10 shows operation waveforms at the time of startup of a power supply device of a comparative example of the present embodiment. The present comparative example shows the operation waveforms of the power supply device not including the PWM frequency setting function performed by the frequency setting circuit 220, and the PWM frequency setting obtainment function in the voltage conversion portion 110 performed by the timer circuit 235, the one-shot circuit 240, the setting voltage determination circuit 245, and the CS discharge control circuit 250 in the power supply device 10.

The first graph from the top of the present figure shows the variation of the VF voltage over time. The second graph from the top shows the change of the FB voltage and the CS voltage over time. The third graph from the top shows the change of the drive signal OUT over time. The fourth graph from the top shows the change of the output voltage Vo of the voltage conversion portion 110 over time.

Prior to turning on the power of the power supply device 10, the capacitor C10 connected to the VF terminal, the capacitor C14 connected to the FB terminal, and the capacitor C9 connected to the CS terminal are not charged. When the power supply device 10 is turned on and the power supply IC1 starts operating, the power supply IC1 pulls up the FB terminal via the resistor R22 and temporarily discharges the CS terminal via the MOS transistor MN1. When the FB voltage exceeds the threshold voltage VthOLP at time ta, the comparator CMP2 outputs the logic H FB overload signal FB_OLP, the overload detection circuit 210 outputs the logic H overload signal OLP, and the power supply device 10 enters the overload mode.

The power supply IC1 finishes pulling up the FB terminal by the resistor R22 in response to the power supply device 10 entering the overload mode. The power supply IC1 gradually charges the capacitor C9 via the CS21 to gradually increase the CS voltage. When the CS voltage exceeds the lower limit voltage of the oscillation signal (1 V in this example) at time tb, the power supply IC1 starts to output the drive signal OUT that becomes logic H from the start of rising of the oscillation signal until the oscillation signal exceeds the CS voltage. Here, when the power supply device does not include the frequency setting circuit 220, the PWM frequency of the drive signal OUT starts from the minimum frequency in the overload mode (PWM frequency defined according to the current Iout output from the multiplier MUL).

When driving of the driving signal OUT starts and the on-duty of the driving signal OUT rises as the CS voltage rises, the capacitor C10 is gradually charged and the VF voltage gradually rises. Along with this, the frequency reduction circuit 215 raises the discharge current Ioff2 by raising the current IB, and raises the PWM frequency. Then, the power supply device 10 also increases the output voltage Vo of the voltage conversion part 110 gradually. When the VF voltage becomes equal to or higher than the upper limit voltage (4.2 V in the figure) for frequency reduction, the Zener diode TD81 in FIG. 8 clamps the voltage VF2 to a constant value. As a result, the current IB is clamped to the maximum value, and the power supply IC1 prevents the PWM frequency from rising further. Here, the discharge current Ioff2 when the current IB is clamped to the maximum value may be set to be equal to or close to the discharge current Ioff1.

When the output voltage Vo reaches the target voltage at time tc, the photodiode PC1A irradiates the phototransistor PC1B with an optical feedback signal having a high light intensity, and the phototransistor PC1B is turned on to discharge the VF voltage charged in the capacitor C14. As a result, the FB voltage becomes equal to or lower than the threshold voltage VthOLP, and the power supply device 10 shifts from the overload mode to the normal mode and starts normal operation.

In the operation of the present comparative example, the power supply device 10 starts up using the same PWM frequency in the normal mode as when the overload is detected. Here, the PWM frequency in the overload mode is set to a low frequency such as ⅕ to ¹⁄₂₀ of the PWM frequency in the normal mode in order to obtain sufficient current drooping characteristics. In addition, since the VF voltage affects the PWM frequency, the capacitor C10 can be set to a relatively large capacity in order to stabilize the operation of the power supply device 10. For this reason, in the operation of the present comparative example, the rise of the output voltage Vo and the VF voltage is delayed, and a startup time Tsa of the power supply device 10 is lengthened.

Figure 11:
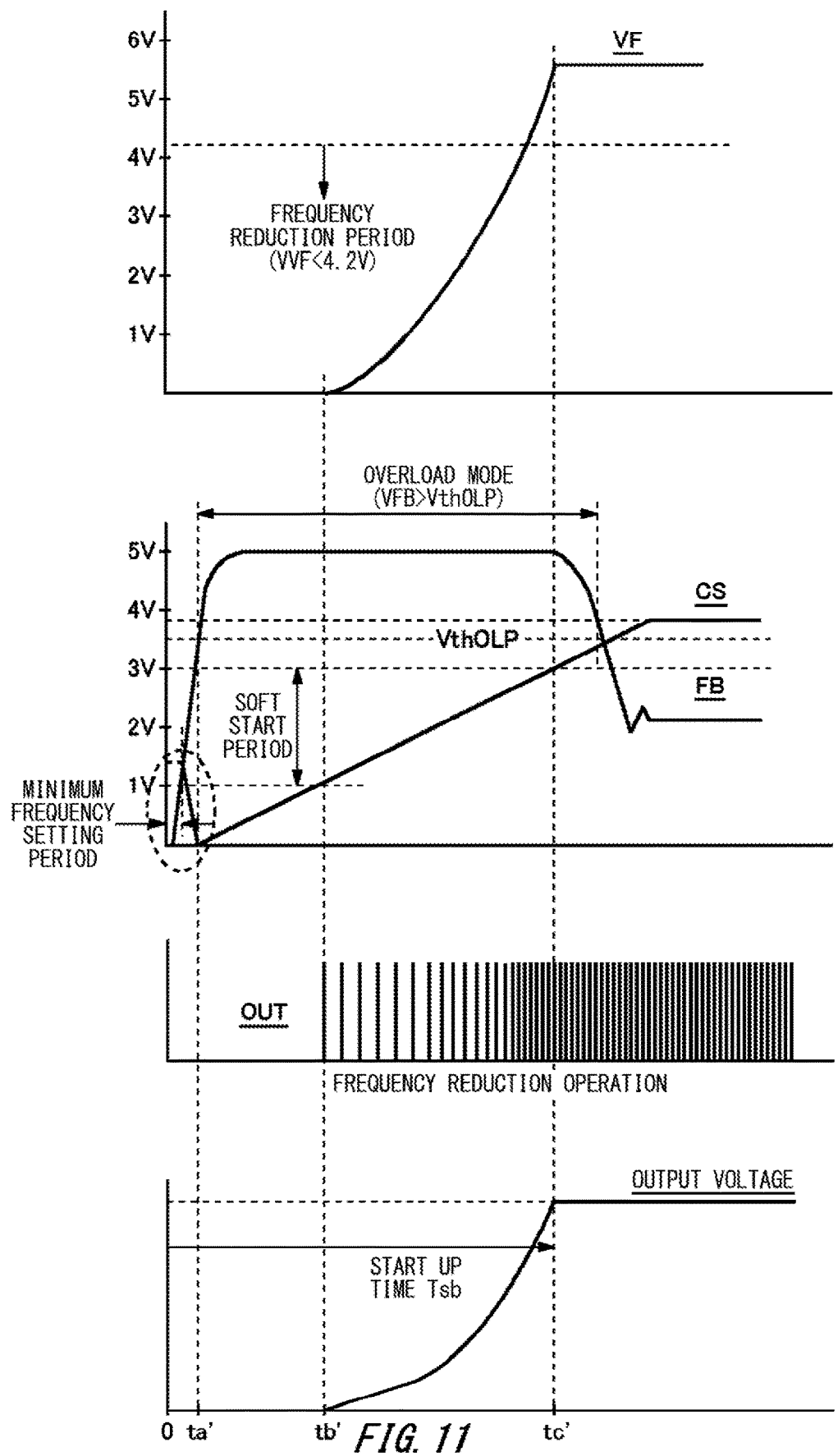
FIG. 11 shows an operation waveform at the time of startup of the power supply device 10 according to the present embodiment.

FIG. 11 shows operation waveforms when the power supply device 10 according to the present embodiment is started up. The four graphs in the present figure correspond to the four graphs in FIG. 10. It is noted that in the present figure, the CS voltage discharge period by the 1 ms pulse output from the timer circuit 235 is omitted for the sake of comparison with FIG. 10 and convenience of explanation.

When the power supply 10 is turned on and the power supply IC1 starts operating, the power supply IC1 pulls up the FB terminal via the resistor R22 and temporarily discharges the CS terminal via the MOS transistor MN1. After the CS terminal is discharged, the one-shot circuit 240 generates a one-shot pulse having a predetermined width in the minimum frequency setting period, and the current sources CS21 and CS22 cause the setting obtainment current to flow to the CS terminal. The set voltage determination circuit 245 detects the CS voltage in response to the falling of the one-shot pulse, and obtains determination values D1 to D2. Thereafter, the CS discharge control circuit 250 outputs the logic H CS discharge signal, and discharges the capacitor C9 until the CS voltage becomes equal to or lower than a predetermined voltage (the threshold voltage VT52 in FIG. 5 and 1 V in the example of the present figure), and until the overload signal OLP becomes logic H. In the present figure, an example is shown in which before the FB voltage exceeds the threshold voltage VthOLP and the overload signal OLP becomes logic H, the CS discharge control circuit 250 discharges the capacitor C9 until the CS voltage becomes 0 V. It is noted that when the CS voltage becomes equal to or lower than the threshold voltage VT52 after the overload signal OLP becomes logic H, the CS discharge control circuit 250 ends the discharge of the capacitor C9 and starts the soft start period.

When the FB voltage exceeds the threshold voltage VthOLP at time ta', the comparator CMP2 outputs the logic H FB overload signal FB_OLP, the overload detection circuit 210 outputs the logic H overload signal OLP, and the power supply device 10 enters the overload mode. The power supply IC1 finishes pulling up the FB terminal by the resistor R22 in response to the power supply device 10 entering the overload mode. The power supply IC1 gradually charges the capacitor C9 via the CS21 to gradually increase the CS voltage. When the CS voltage exceeds the lower limit voltage of the oscillation signal (1 V in this example) at time tb, the power supply IC1 starts to output the drive signal OUT that becomes logic H from the start of rising of the oscillation signal until the oscillation signal exceeds the CS voltage.

Here, when at least one of the determination values D1 and D2 is logic H in the minimum frequency setting period, the discharge current Ioff2 in the overload mode is larger than the discharge current Ioff2 in the overload mode entered due to the overload generated during normal operation (the discharge current Ioff2 when the determination values D1 and D2 are both logic L). For this reason, the minimum PWM frequency in the overload mode entered when starting up the voltage conversion portion 110 is higher than the minimum PWM frequency in the overload mode entered due to the overload generated during normal operation. As an example, the minimum PWM frequency in the overload mode entered when starting up the voltage conversion portion 110 may be ½ to ⅕ of the PWM frequency during normal operation. It is noted that when the PWM frequency falls within an audible frequency band (for example, 20 kHz or less), the power supply device 10 may generate a sound along with the switching of the switching device Q1. Therefore, the power supply IC1 may set the minimum PWM frequency in the overload mode entered due to the overload generated during normal operation to a frequency (for example, 25 kHz or more) higher than the audible frequency band, and set the PWM frequency during startup and normal operation to an even higher frequency.

Thereafter, the power supply device 10 increases the output voltage Vo in the same manner as in FIG. 10, and the output voltage Vo reaches the target voltage and the power supply device 10 shifts to the normal mode. In the operation shown in the present figure, the power supply device 10 is started up using a higher PWM frequency than when an overload is detected in the normal mode. For this reason, the power supply device 10 according to the present embodiment can shorten a startup time Tsb of the power supply device 10 by quickening the rise of the output voltage Vo and VF voltage at the time of startup. In addition, for example, by selecting the resistance value of the resistor Rset according to the capacitance of the capacitor C10 connected to the VF terminal, a manufacturer can appropriately select the PWM frequency at startup according to the characteristics of the use and load of the power supply device 10, and/or the characteristic values of the components connected to the power supply IC1 such as the capacitor C10.

It is noted that when the CS voltage becomes 0 V before the FB voltage exceeds the threshold voltage VthOLP as shown in the present figure, the power supply IC1 cannot generate the pulse of the drive signal OUT until the capacitor C9 is charged again and the CS voltage reaches the lower limit voltage of the oscillation signal again. Therefore, in response to the CS voltage becoming the threshold voltage VT52 or less before the overload signal OLP becomes logic H after the minimum frequency setting period during startup, the power supply IC1 may stop both the charging (charging by at least one of the current sources CS21 to CS22) and the discharging (discharging by the MOS transistor MN1) of the CS terminal until the overload signal OLP becomes logic H.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 Power supply device
100 AC-DC conversion portion
110 Voltage conversion portion
120 Output voltage detection circuit
130 Power supply control portion
200 Oscillator
205 One-shot circuit
207 Output driver circuit
210 Overload detection circuit
215 Frequency reduction circuit
220 Frequency setting circuit
225 Internal power supply
230 Initialization circuit
235 Timer circuit
240 One-shot circuit
245 Setting voltage determination circuit
250 CS discharge control circuit
510 Delay circuit
520 Delay circuit

What is claimed is:

1. A power supply device, comprising:
a voltage conversion portion configured to convert an input voltage to an output voltage by pulse width modulation;
a frequency reduction circuit configured to reduce a frequency of the pulse width modulation from a first frequency to a second frequency in response to detection of an overload during normal operation of the voltage conversion portion; and
a frequency setting circuit configured to set the frequency of the pulse width modulation used when starting up the voltage conversion portion to a third frequency that is higher than the second frequency but lower than the first frequency prior to the detection of the overload;
wherein the second frequency is higher than a minimum frequency, and where the minimum frequency is greater than 0 hertz.

2. The power supply device according to claim 1, wherein the voltage conversion portion includes:
a transformer;
a switching device that is driven by the pulse width modulation and switches whether or not the input voltage is applied to a primary side of the transformer; and
a rectifier circuit for obtaining the output voltage from a secondary side of the transformer.

3. The power supply device according to claim 2, further comprising:
an output voltage detection circuit for detecting the output voltage; and
an overload detection circuit for detecting the overload of the voltage conversion portion in response to the detected output voltage being less than a lower limit output voltage.

4. The power supply device according to claim 3, wherein the overload detection circuit detects the overload of the voltage conversion portion in response to a current flowing through the switching device exceeding an upper limit current.

5. The power supply device according to claim 4, further comprising:
a soft start control voltage output portion for outputting a soft start control voltage for starting up the voltage conversion portion by a soft start;
an oscillator for outputting an oscillation signal that oscillates at the frequency of the pulse width modulation; and
a pulse width modulation portion for outputting a pulse signal having a pulse width corresponding to a result of comparing the soft start control voltage and a voltage of the oscillation signal.

6. The power supply device according to claim 5, wherein the soft start control voltage output portion outputs the soft start control voltage obtained by charging a soft start capacitor with a soft start current in response to startup of the voltage conversion portion.

7. The power supply device according to claim 6, wherein
the soft start control voltage output portion causes a setting obtainment current that is larger than the soft start current to flow to a soft start terminal connected to the soft start capacitor prior to startup of the voltage conversion portion;
the power supply device further comprises a setting voltage determination circuit for determining a voltage of the soft start terminal obtained in response to the flowing of the setting obtainment current; and
the frequency setting circuit sets the minimum frequency of the pulse width modulation during startup of the voltage conversion portion according to the voltage of the soft start terminal determined by the setting voltage determination circuit.

8. The power supply device according to claim 7, further comprising a setting resistor connected to the soft start terminal in series with the soft start capacitor.

9. The power supply device according to claim 7, further comprising a discharge control circuit for temporarily discharging the soft start capacitor in response to the setting of the minimum frequency of the pulse width modulation during startup of the voltage conversion portion.

10. The power supply device according to claim 7, wherein
the oscillator includes:
a capacitor; and
a charge/discharge circuit for raising the oscillation signal corresponding to a voltage of the capacitor to a predetermined upper limit voltage by supplying a charge current to the capacitor, and for lowering the oscillation signal to a predetermined lower limit voltage by discharging a discharge current from the capacitor; and
the frequency setting circuit sets the minimum frequency of the pulse width modulation by controlling a current amount of at least one of the charge current and the discharge current.

11. A power supply control device configured to control a voltage conversion portion for converting an input voltage to an output voltage by pulse width modulation, comprising:
a frequency reduction circuit configured to reduce a frequency of the pulse width modulation from a first frequency to a second frequency in response to detection of an overload during normal operation of the voltage conversion portion; and
a frequency setting circuit configured to set the frequency of the pulse width modulation used when starting up the voltage conversion portion to a third frequency that is higher than the second frequency but lower than the first frequency prior to the detection of the overload;
wherein the second frequency is higher than a minimum frequency, and where the minimum frequency is greater than 0 hertz.

12. The power supply control device according to claim 11, wherein
the voltage conversion portion includes:
a transformer;
a switching device that is driven by the pulse width modulation and switches whether or not the input voltage is applied to a primary side of the transformer;
a rectifier circuit for obtaining the output voltage from a secondary side of the transformer; and
an output voltage detection circuit for detecting the output voltage; and
the power supply control device further comprises an overload detection circuit for detecting the overload of the voltage conversion portion in response to the output voltage detected by the output voltage detection circuit being less than a lower limit output voltage.

13. The power supply control device according to claim 12, wherein the overload detection circuit detects the overload of the voltage conversion portion in response to a current flowing through the switching device exceeding an upper limit current.

14. The power supply control device according to claim 13, further comprising:
a soft start control voltage output portion for outputting a soft start control voltage for starting up the voltage conversion portion by a soft start;
an oscillator for outputting an oscillation signal that oscillates at the frequency of the pulse width modulation; and
a pulse width modulation portion for outputting a pulse signal having a pulse width corresponding to a result of comparing the soft start control voltage and a voltage of the oscillation signal.

15. The power supply control device according to claim 14, wherein the soft start control voltage output portion outputs the soft start control voltage obtained by charging a soft start capacitor with a soft start current in response to startup of the voltage conversion portion.

16. The power supply control device according to claim 15, wherein
the soft start control voltage output portion causes a setting obtainment current that is larger than the soft start current to flow to a soft start terminal connected to the soft start capacitor prior to startup of the voltage conversion portion;
the power supply control device further comprises a setting voltage determination circuit for determining a voltage of the soft start terminal obtained in response to the flowing of the setting obtainment current; and
the frequency setting circuit sets the minimum frequency of the pulse width modulation during startup of the voltage conversion portion according to the voltage of the soft start terminal determined by the setting voltage determination circuit.

17. A power supply control method for controlling a voltage conversion portion for converting an input voltage to an output voltage by pulse width modulation, comprising:

reducing a frequency of the pulse width modulation from a third frequency to a second frequency in response to detection of an overload of the voltage conversion portion during startup of the voltage conversion portion; and setting the frequency of the pulse width modulation used when starting up the voltage conversion portion to the third frequency that is higher than the second frequency but lower than a first frequency prior to the detection of the overload;

wherein the second frequency is higher than a minimum frequency, and where the minimum frequency is greater than 0 hertz.

18. The power supply device of claim 1, wherein in response to the overload dissipating, the frequency of the pulse width modulation increases from the second frequency to the first frequency used for normal operation.

19. The power supply device of claim 17, wherein in response to the overload dissipating, the frequency of the pulse width modulation increases from the second frequency to the first frequency used for normal operation.

* * * * *